(12) United States Patent
Wallstedt et al.

(10) Patent No.: US 11,136,018 B2
(45) Date of Patent: Oct. 5, 2021

(54) SPEED PLANNING DEVICE FOR A VEHICLE

(71) Applicant: Caterpillar Inc., Deerfield, IL (US)

(72) Inventors: Philip Wallstedt, Washington, IL (US); Emily Morris, Peoria, IL (US); Joshua Struble, Chillicothe, IL (US); Matthew D. Johnson, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 440 days.

(21) Appl. No.: 16/182,292

(22) Filed: Nov. 6, 2018

(65) Prior Publication Data
US 2020/0139954 A1 May 7, 2020

(51) Int. Cl.
| | |
|---|---|
| *B60W 30/14* | (2006.01) |
| *B60W 40/076* | (2012.01) |
| *B60W 10/08* | (2006.01) |
| *B60W 10/18* | (2012.01) |
| *G06F 16/29* | (2019.01) |

(52) U.S. Cl.
CPC ............ *B60W 10/08* (2013.01); *B60W 10/18* (2013.01); *B60W 30/143* (2013.01); *B60W 40/076* (2013.01); *G06F 16/29* (2019.01); *B60W 2400/00* (2013.01); *B60W 2530/10* (2013.01); *B60W 2552/15* (2020.02); *B60W 2555/40* (2020.02); *B60W 2710/08* (2013.01); *B60W 2710/18* (2013.01); *B60W 2720/106* (2013.01)

(58) Field of Classification Search
CPC ............. B60W 30/143; B60W 40/076; B60W 2552/15; B60W 2555/40; B60W 2720/106; B60W 2530/10; B60W 2400/00; B60W 2710/08; B60W 2710/18; B60W 10/08; B60W 10/18; G06F 16/29; G05D 2201/0202; G05D 1/0223
USPC .......................................................... 701/93
See application file for complete search history.

(56) References Cited

U.S. PATENT DOCUMENTS

| 6,044,312 A | 3/2000 | Sudo et al. |
|---|---|---|
| 7,966,106 B2 | 6/2011 | Sudou et al. |
| 8,210,991 B2 | 7/2012 | Yuet et al. |
| (Continued) | | |

FOREIGN PATENT DOCUMENTS

| CN | 106740764 A | 5/2017 |
|---|---|---|
| KR | 101400267 B1 | 7/2014 |

*Primary Examiner* — Nadeem Odeh
(74) *Attorney, Agent, or Firm* — Harrity & Harrity LLP

(57) ABSTRACT

A speed planning device is disclosed. The speed planning device may perform a method including obtaining elevation information associated with a route for a vehicle; identifying a section of the route based on the elevation information, wherein the section is associated with a change in elevation; determining subsections of the section; determining respective slopes of the subsections and respective lengths of the subsections; obtaining information identifying a mass associated with the vehicle; generating a speed plan for the vehicle to traverse the section, wherein the speed plan indicates one or more speeds at which the vehicle is to correspondingly traverse the subsections based on the respective slopes of the subsections, the respective lengths of the subsections, and the mass associated with the vehicle; and providing the speed plan to permit the vehicle to be controlled to traverse the section according to the one or more speeds of the speed plan.

20 Claims, 12 Drawing Sheets

(56) References Cited

U.S. PATENT DOCUMENTS

2012/0083985 A1\* 4/2012 Johansson ............. B60W 40/06
  701/93
2017/0129492 A1\* 5/2017 Follen ................. B60W 30/143
2017/0327113 A1\* 11/2017 Yamakado .......... B60W 40/076
2018/0043868 A1 2/2018 Ge et al.

\* cited by examiner

SPEED PLANNING DEVICE FOR A VEHICLE

TECHNICAL FIELD

The present disclosure relates generally to control of a vehicle and, more particularly, to a speed planning device for a vehicle.

BACKGROUND

Speed control of a vehicle (e.g., a haul truck, a loader, and/or the like) may involve slowing or retarding the speed of the vehicle (e.g., while descending a decline). The speed of the vehicle may be slowed to prevent the speed of the vehicle from reaching "a point of no return" at which the vehicle may no longer be able to be slowed using a speed control mechanism (e.g., a brake system, an electric transmission system, a mechanical transmission system, and/or the like) of the vehicle. Such a point may be reached due to a failure of the speed control mechanism.

Some speed control strategies may be based on tables that guide an operator to set or control a speed of a vehicle. The tables may indicate that the operator, for a particular vehicle and under a particular load, is to traverse a decline with a particular slope at a particular speed. However, such tables may not consider various other factors associated with a route that the vehicle is to travel and/or the vehicle. Furthermore, such tables may not be applicable to autonomous control of the vehicle because the tables are too rigid and are developed with the consideration that the operator may subjectively adjust the speed of the vehicle regardless of what is indicated in the table.

A system to slow a speed of a vehicle is disclosed in U.S. Pat. No. 8,210,991 that issued to Yuet et al. on Jul. 3, 2012 ("the '991 patent"). In particular, the '991 patent discloses a control system that includes "a first sensor to generate a first signal indicative of an inclination of a machine, a second sensor to generate a second signal indicative of a travel speed of the machine, a third sensor configured to generate a third signal indicative of an engine speed of the machine, and a control system to determine whether the machine is freewheeling in a neutral gear, and to generate a machine braking command based on at least one of the first, second, and third signals."

While the control system of the '991 patent may be used to slow a vehicle, the '991 patent relies upon contemporaneous conditions of the vehicle, and does not generate a speed plan for the vehicle based on information associated with a route of the vehicle.

The speed planning device of the present disclosure solves one or more of the problems set forth above and/or other problems in the art.

SUMMARY

According to some implementations, a method may include obtaining elevation information associated with a route for a vehicle; identifying a section of the route based on the elevation information, wherein the section is associated with a change in elevation; determining subsections of the section; determining respective slopes of the subsections and respective lengths of the subsections; obtaining information identifying a mass associated with the vehicle; generating a speed plan for the vehicle to traverse the section, wherein the speed plan indicates one or more speeds at which the vehicle is to correspondingly traverse the subsections based on the respective slopes of the subsections, the respective lengths of the subsections, and the mass associated with the vehicle; and providing the speed plan to permit the vehicle to be controlled to traverse the section according to the one or more speeds of the speed plan.

According to some implementations, a device may include one or more memories; and one or more processors, communicatively coupled to the one or more memories, to: obtain elevation information associated with a route of a vehicle; identify a section of the route of the vehicle that is to be analyzed to control a speed of the vehicle through the section; divide the section of the route into subsections; determine respective slopes of the subsections based on the elevation information; obtain information identifying a mass associated with the vehicle; generate a speed plan for the vehicle to traverse the section, wherein the speed plan indicates one or more speeds at which the vehicle is to correspondingly traverse the subsections based on the respective slopes of the subsections, respective lengths of the subsections, and the mass associated with the vehicle; and perform an action associated with the speed plan to permit the vehicle to be controlled to traverse the section.

According to some implementations, a system may include a vehicle control device capable of controlling a speed of a vehicle; and a speed planning device to determine one or more speeds at which the vehicle is to traverse a route based on elevation information associated with the route, wherein the speed planning device is to: identify a section of the route, wherein the section of the route is to be traversed by the vehicle within a threshold time period; detect a decline in the section based on the elevation information; identify subsections of the section based on detecting the decline of the section; determine respective slopes of the subsections based on the elevation information; obtain information identifying mass associated with the vehicle; generate a speed plan for the vehicle to traverse the section, wherein the speed plan indicates one or more speeds at which the vehicle is to correspondingly traverse the subsections based on the respective slopes of the subsections, respective lengths of the subsections, and the mass associated with the vehicle; and provide the speed plan to the vehicle control device, wherein the vehicle control device is configured to automatically control the speed of the vehicle, as the vehicle traverses the section according to the speed plan.

DETAILED DESCRIPTION

This disclosure relates to a speed planning device for a vehicle. The speed planning device has universal applicability to any vehicle that can benefit from speed planning. The "vehicle" may refer to any personal vehicle, recreational vehicle, and/or any vehicle that performs an operation associated with an industry such as, for example, mining, construction, farming, transportation, entertainment, racing, and/or the like. Examples of vehicles include a haul truck, a backhoe loader, a wheel loader, a compactor, a harvester, an excavator, an industrial loader, a road reclaimer, a skid steer loader, a skidder, a telehandler, a tractor, a dozer, a tractor scraper, and/or the like. In some implementations, the vehicle may be autonomous and/or semi-autonomous. In some implementations, the vehicle may be operator controlled with autonomous control capability that may be activated by the operator. The vehicle may include an electric drive and/or mechanical drive.

Figure 1:
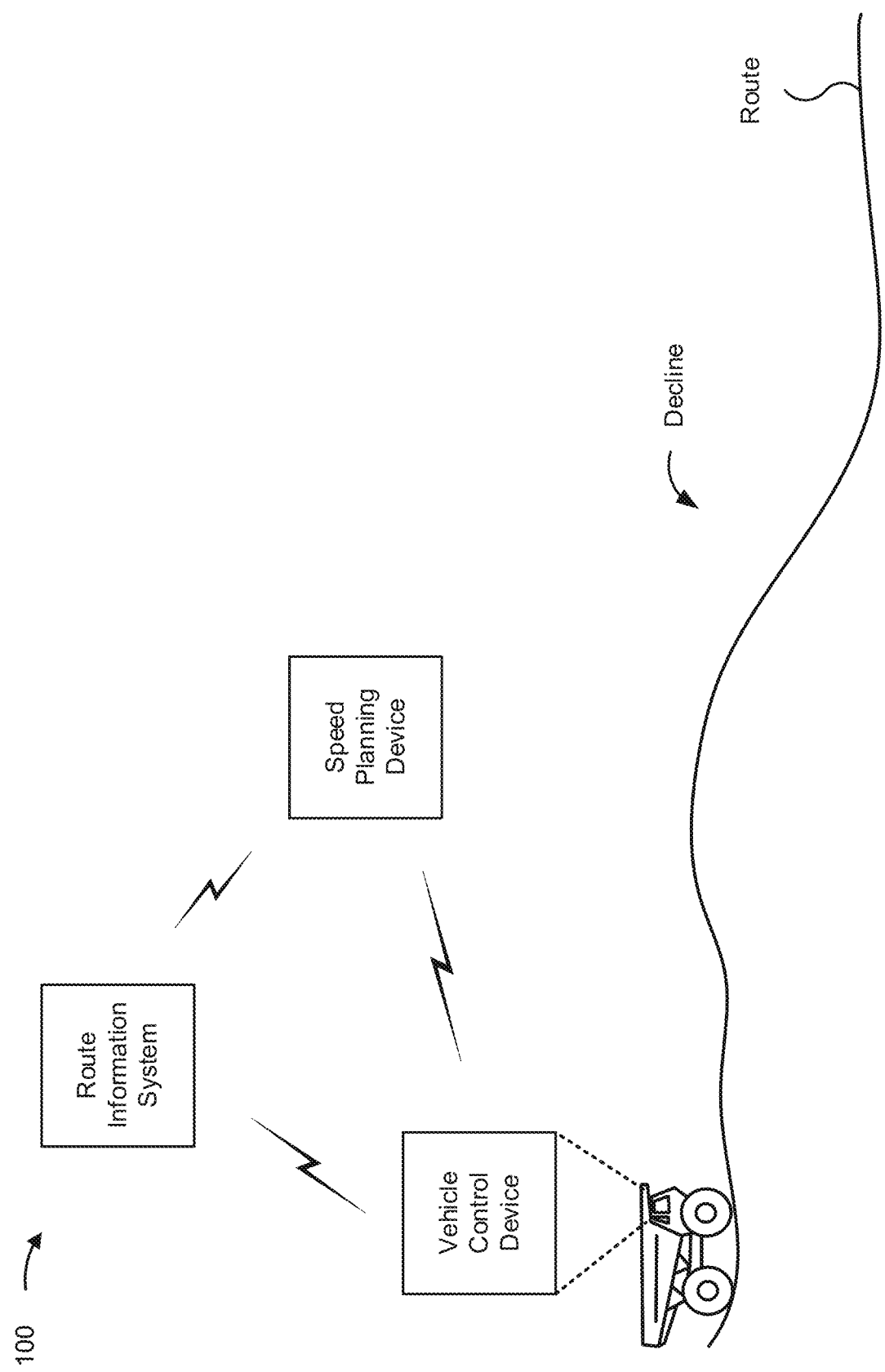
FIG. 1 is diagram of an example implementation described herein.

FIG. 1 is a diagram of an example implementation 100 described herein. Example implementation 100 of FIG. 1 includes a speed planning device, a route information system, and a vehicle control device of a vehicle (shown as a haul truck). In some implementations, one or more of the speed planning device, the route information system, or the vehicle control device may be located on or within the vehicle or remotely from the vehicle.

As shown in the implementation depicted in FIG. 1, the vehicle is to traverse a route that includes changes in elevation. As described herein, the speed planning device may generate a speed plan for the vehicle to traverse the route. The speed plan may indicate one or more speeds at which the vehicle is to traverse the route. In some implementations, the speed plan may indicate locations (e.g., coordinates) along the route at which the speed of the vehicle is to change according to the speed plan.

The speed plan may be generated based on route information from the route information system, one or more operating characteristics of the vehicle (e.g., a mass associated with the vehicle, a location of the vehicle, a load associated with the vehicle, a configuration of the load (whether the load is being towed behind the vehicle or hauled within a cavity of the vehicle), a distribution of the load, and/or the like) and/or one or more parameters associated with the vehicle (e.g., a brake temperature of the vehicle, an engine coolant temperature of the vehicle, a heat rejection rate associated with a brake of the vehicle, a heat capacity associated with the brake of the vehicle, and/or the like). In some implementations, the one or more operating characteristics may be represented by measured values that may change as the vehicle traverses the route and/or change between routes and/or operations. In some implementations, the one or more parameters may be represented by values that are to be maintained within a range as the vehicle traverses the route and/or maintained across routes and/or operations.

The speed planning device may provide the speed plan to the vehicle control device, which may control the speed of the vehicle according to the speed plan. The speed planning device may provide the speed plan to the vehicle control device as data of a data structure (e.g., a mapping, a table, a graph, and/or the like) and/or within a message (e.g., a message communicated via a wired and/or wireless communication link). In some implementations, the speed plan may be considered an update to a previous speed plan provided to the vehicle control device. Accordingly, a generated speed plan may correspond to a generated update to a speed plan.

In some implementations, the speed planning device may generate a speed plan periodically as the vehicle traverses the route. For example, the speed planning device may generate a speed plan for the vehicle every threshold time period (e.g., every second, every ten seconds, every minute, every five minutes, and/or the like). Accordingly, a speed at which the vehicle is to traverse a section or subsection of the route may change from one iteration of generating the speed plan to the next. Additionally, or alternatively, the speed planning device may generate and/or provide a speed plan to the vehicle control device based on a particular event involving the vehicle. For example, the speed planning device may generate a speed plan based on the vehicle reaching a particular location (e.g., a particular location along the route), based on the vehicle approaching a threshold change in elevation in the route, based on a change in one or more operating characteristics of the vehicle (e.g., a mass of the vehicle, a location of the vehicle, an operating speed of the vehicle, a performance measurement of the vehicle, a temperature associated with the vehicle, a battery level of the vehicle, and/or the like), based on a change in weather conditions, based on a change in traffic conditions along the route, and/or the like. In some implementations, the speed planning device may generate and/or update a speed plan based on an event involving the speed planning device. For example, the speed planning device may generate and/or provide a speed plan to the vehicle control device based on receiving route information from the route information system, based on a user input (e.g., received via a user interface communicatively coupled with the speed planning device) to generate a speed plan, and/or the like.

The speed planning device may generate a speed plan for the vehicle based on route information for the route. The route information may be received from the route information system (e.g., periodically, based on a location of the vehicle, before an operation associated with the vehicle begins, before the vehicle starts to traverse the route, and/or the like). The route information may include information identifying a start point of the route and one or more destinations of the route. Furthermore, the route information may include elevation information that identifies one or more elevations (or altitudes) along the route (e.g., at points along the route). In some implementations, the route information may include surface information along the route, such as information identifying a surface type (e.g., dirt, asphalt, gravel, sand, and/or the like), a grip measure of the surface, a roughness (or smoothness) measure, a surface condition (e.g., a condition caused by weather, such as mud-covered, snow-covered, ice-covered, and/or the like), and/or the like. In some implementations, the route information may include or identify speed limits and/or fixed speed regulations indicating a minimum, a maximum, and/or a specific speed at which the vehicle is to traverse certain points of the route. In some implementations, the route information may be updated in real-time by one or more sensors in communication with the route information system (e.g., one or more sensors on one or more vehicles that are traversing the route or have traversed the route, to update any elevation changes, any surface conditions, and/or the like), based on one or more sensors along the route, and in communication with the route information system. Additionally, or alternatively, the route information system may be in communication with a traffic monitoring server, a weather monitoring server, and/or the like that may update the route information system.

According to some implementations, the speed planning device may analyze the elevation information to detect a decline in elevation along the route. As described herein, the speed planning device may select one or more speeds at which the vehicle is to descend the decline based on an analysis of one or more subsections of the route (which may include one or more subsections of the decline). The one or more speeds may be set within a speed plan that is provided by the speed planning device to the vehicle control device to permit the vehicle control device to control the speed of the vehicle, according to the one or more speeds of the speed plan, as the vehicle traverses the decline.

In this way, the speed planning device may generate a speed plan to enable the vehicle control device to control the vehicle to traverse a route according to the speed plan. The speed plan may be generated based on one or more operating characteristics (e.g., mass, battery level, and/or the like) associated with the vehicle, information associated with the route (e.g., elevation information), one or more parameters that are to be maintained (e.g., within a range) for the vehicle throughout the route, and/or the like. Further, the speed planning device may generate a speed plan for the vehicle to optimize one or more performance characteristics (e.g., speed, a life span of the vehicle and/or a component or part of the vehicle, fuel consumption, and/or the like) associated with the vehicle traversing the route.

In some implementations, the speed planning device may use a machine learning model, such as a speed planning model, to generate a speed plan for a route. For example, the speed planning device may train the speed planning model based on one or more speed planning parameters associated with planning a speed for a vehicle to traverse a route, such as route information associated with the route, one or more operating characteristics of the vehicle, one or more parameters that are to be maintained as the vehicle traverses the route, one or more operating characteristics of one or more other vehicles traversing the route, and/or the like. The speed planning device may train the speed planning model using historical data associated with generating a speed plan for the vehicle to traverse the route or associated with generating one or more other speed plans for one or more other vehicles to traverse the route and/or other routes according to the one or more speed planning parameters. Using the historical data and the one or more speed planning parameters as inputs to the speed planning model, the speed planning device may generate a speed plan to permit a vehicle to traverse the route according to the speed plan.

As indicated above, FIG. 1 is provided as an example. Other examples may differ from what is described in connection with FIG. 1.

Figure 2:
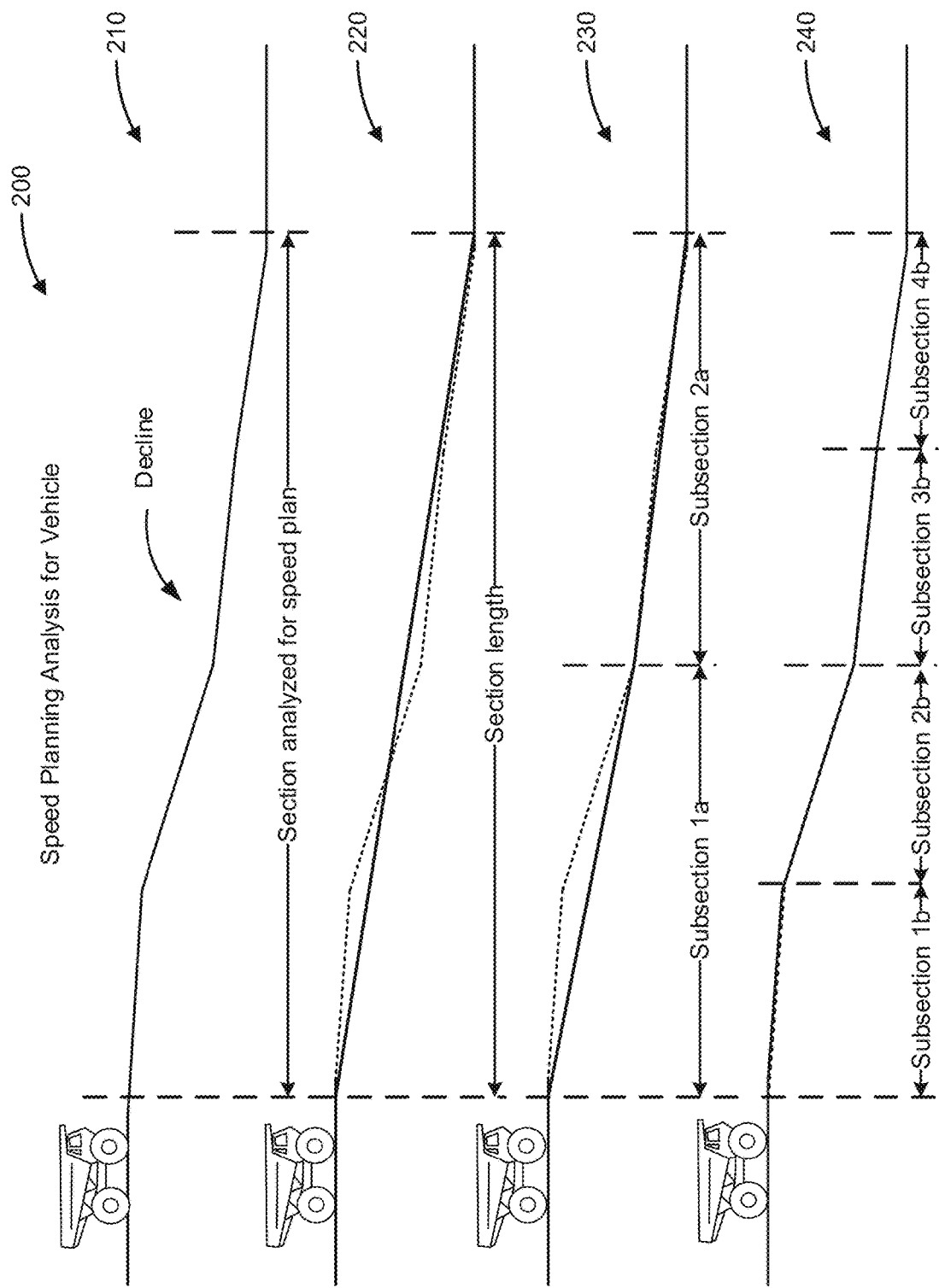
FIGS. 2-9 are diagrams of example implementations associated with speed planning for a vehicle described herein.

FIG. 2 is a diagram of an example implementation 200 associated with speed planning for a vehicle described herein. In example implementation 200, a speed planning analysis is performed for a section of a route that may be traversed by a vehicle. The speed planning analysis may be performed by a speed planning device, such as the speed planning device of FIG. 1, to determine information associated with generating a speed plan for the vehicle to traverse that section of the route (e.g., based on the location of the vehicle). The speed planning device may perform the speed planning analysis using a speed planning model described herein. As shown by the example in FIG. 2, the speed planning device may analyze the section of the route to determine one or more speeds at which the vehicle is to traverse the section of the route.

As shown in FIG. 2, and by reference number 210, the section of the route includes a decline. In some implementations, the speed planning device may prepare the speed plan based on the vehicle approaching a decline (e.g., being within a threshold distance of the decline). For example, the speed planning device may use elevation information (e.g., from a route information system) of the route to identify the decline and prepare a speed plan to slow (or retard) the speed of the vehicle to enable the vehicle to descend the decline according to one or parameters associated with vehicle. The speed planning device may identify the decline based on indicated changes in elevation along the route (i.e., the decline) in the elevation information.

As further shown in FIG. 2, and by reference number 220, the section of the route may have a particular length based on a configuration of the speed planning device. For example, the speed planning device may prepare a speed plan for the vehicle for the next kilometer, the next two kilometers, and/or the like of the route. In such cases, the speed planning device may iteratively analyze (e.g., regardless of whether there are changes in elevation or no changes in elevation) upcoming sections of the route as the vehicle traverses the route. As used herein, a length of a section may correspond to a distance that follows the path and elevation of the route or a straight-line distance between coordinates of a start point of the section and coordinates of an end point of the section (e.g., as viewed from above, without considering elevation changes along the route). In example implementation 200 of FIG. 2, the length of the section corresponds to the length of the decline. In some implementations, the length of the section may be shorter or longer than an identified decline in the route.

In example implementation 200, the speed planning device calculates a slope of the section to determine a candidate speed at which the vehicle may traverse the section. As further shown by reference number 220, a slope (solid line) is identified for the elevation change (i.e., the decline) of the analyzed section of the route (dotted line). Accordingly, the speed planning device may identify how steep the decline is based on the calculated slope. The speed planning device may calculate a candidate speed at which the vehicle may traverse the section of the route based on the calculated slope and/or the length of the section, as described further herein.

According to some implementations described herein, when calculating the slope of a section and/or subsection, the speed planning device may identify a start point and an end point of the corresponding section and/or subsection along the route. Using the start point and the end point, for each section or subsection, the speed planning device may reference the elevation information from the route information system (e.g., which may include a mapping of elevation at locations along the route) to identify an elevation at the start point and an elevation at the end point. Accordingly, for each section or subsection, based on (1) a difference between the elevation at the start point and the elevation at the end point and (2) a distance between the start point and the end point (i.e., the length of the section and/or subsection), the speed planning device may calculate the slope of the section and/or subsection.

As described herein, candidate speeds are calculated in association with the speed planning analysis of example implementation 200. A candidate speed for a section or subsection of a speed planning analysis may be calculated based on the slope of the section or subsection. For example, the speed planning device may determine that a candidate speed for a relatively steep decline is to be relatively slow (e.g., slower than on a flat surface or incline) and that a candidate speed for a relatively flat surface and/or incline can be relatively fast (e.g., faster than on a decline). Additionally, or alternatively, a candidate speed for a section or subsection of the speed planning analysis may be calculated based on a length of the section or subsection. For example, the speed planning device may determine that a candidate speed for a relatively short decline is to be relatively fast and that a candidate speed for a relatively long decline is to be relatively slow.

In some implementations, the candidate speed may be calculated based on a mass associated with the vehicle (e.g., the mass of the vehicle, a mass of a load of the vehicle, and/or the like). For example, for a decline, if the vehicle has a relatively high mass, the vehicle may be directed to descend the decline slower than a vehicle with a relatively low mass. Additionally, or alternatively, the candidate speed may be calculated based on one or more parameters associated with the vehicle. For example, the one or more parameters may serve as constraints that are to be maintained within a range during operation of the vehicle (e.g., while the vehicle is traversing the route). The one or more parameters may include a temperature associated with a braking mechanism of the vehicle, an engine coolant temperature of the vehicle, a heat rejection rate associated with a brake of the vehicle, a heat capacity associated with the brake of the vehicle, and/or the like. In some implementations, as described herein, the one or more parameters may serve as inputs to a model (e.g., which may be referred to herein as a damage model) configured to extend a life span of a component of the vehicle (e.g., a braking mechanism, a transmission, and/or the like) and/or the vehicle, itself.

As further shown in FIG. 2, and by reference number 230, the speed planning device may perform a first iteration of determining (or identifying) subsections of the section (shown as subsection 1a and subsection 2a). For example, as shown, the speed planning device may divide the section in half to identify subsection 1a and subsection 2a, such that subsection 1a and subsection 2a have a same length. As further shown by reference number 230, the speed planning device may then calculate the slopes (solid lines) of the declines (dotted lines) of subsection 1a and subsection 1b. For the speed planning analysis of the section, the speed planning device may calculate, based on the slopes of subsection 1a and subsection 2a, a candidate speed for subsection 1a at which the vehicle may traverse subsection 1a and a candidate speed for subsection 2a at which the vehicle may traverse subsection 2a.

As further shown in FIG. 2, and by reference number 240, the speed planning device may perform a second iteration of determining subsections of the section (shown as subsection 1b, subsection 2b, subsection 3b, and subsection 4b). For example, the speed planning device may divide the section into quarters, such that subsection 1b, subsection 2b, subsection 3b, and subsection 4b have a same length. Accordingly, as shown in FIG. 2, subsection 1b and subsection 2b overlap with subsection 1a and, subsection 3b and subsection 4b overlap with subsection 2a.

As shown by reference number 240, calculated slopes for subsection 1b, subsection 2b, subsection 3b, and subsection 4b correspond to the elevation changes of each subsection (as such dotted lines for the elevation changes are hidden by solid lines for the slopes). Again, for this iteration of the speed planning analysis of the section of example implementation 200, the speed planning device may calculate, based on the slopes of subsection 1b, subsection 2b, subsection 3b, and subsection 4b, respective candidate speeds at which the vehicle may traverse subsection 1b, subsection 2b, subsection 3b, and subsection 4b. In some implementations, one or more further iterations of dividing the section may be performed to divide the section into eighths, sixteenths, and so on.

In some implementations, for an iteration of determining subsections of a section (e.g., dividing the section into subsections), when the speed planning device determines that calculated slopes of subsections substantially match (e.g., within a threshold tolerance or range) the elevation of the subsections, the speed planning device may determine that another iteration of determining subsections of the section is not to be performed. For example, the speed planning device may determine, from the elevation information, that the elevation between corresponding start points and endpoints of the subsection does not deviate more than a threshold amount from the corresponding slopes of the subsections. In such cases, that iteration of the speed planning analysis for the section may be the most granular level possible for that section according to the speed planning analysis, and, thus, the speed planning device may end the speed planning analysis of that section and move on to a speed analysis of a next section of the route.

As described herein, from the candidate speeds calculated based on each of the above measured slopes of the section and/or subsections of example implementation 200, the speed planning device may select a speed from the candidate speeds (e.g., a minimum calculated candidate speed) for each of the subsections of the route. The selected speed may then be included in a speed plan and provided to the vehicle control device, which may control the vehicle to traverse the subsections of the route according to the indicated speeds in the speed plan.

Therefore, as shown in FIG. 2, the speed planning device may perform a speed planning analysis (e.g., using a speed planning model) for the vehicle that includes one or more iterations (as shown by reference numbers 220, 230, 240) of identifying the section, determining subsections of the section, and calculating candidate speeds for the section and/or subsections of the section. In some implementations, the number of iterations, which may correspond to a degree of granularity involved in the speed planning analysis, may be configured according to a user input based on default settings of the speed planning device (e.g., settings configured for a particular work site of the vehicle, for a particular use or application of the vehicle, according to one or more governmental regulations for the vehicle, and/or the like), and/or based on one or more operating characteristics of the vehicle (e.g., a mass of the vehicle, an operating speed of the vehicle, a type of load of the vehicle, a battery level of the vehicle, and/or the like).

Additionally, or alternatively, the speed planning device may determine the degree of granularity for a speed planning analysis of a section based on elevation changes identified in the section. For example, for sections that include a relatively high amount of elevation changes or slope changes, the speed planning device may perform more iterations of dividing the section (or route) into subsections and calculating corresponding candidate speeds (i.e., the speed planning analysis may be more granular). On the other hand, for routes that include relatively few elevation changes or slope changes, the speed planning device may perform fewer iterations of dividing the section into subsections and calculating corresponding candidate speeds (i.e., the speed planning analysis may be less granular). In some implementations, from the elevation information, the speed planning device may calculate the number of elevation changes and/or slope changes based on an average value of the elevation identified at points or locations along the route, a standard deviation of the elevation at the points or locations, and/or the like. In some implementations, the speed planning device may use the speed planning model, which may be trained according to elevation information and historical selections of degrees of granularity based on the elevation information, to determine the degree of granularity for a speed planning analysis of a section of a route.

Although example implementation 200 of FIG. 2 shows the speed planning analysis identifying subsections of equal length in each iteration of the speed planning device based on dividing the lengths of the subsection in each iteration in half (0.5), any other divider (which may be any fraction or multiplier of a previous subsection length) may be used (e.g., based on the length of the section and/or a subsection length of a previous iteration) to divide the section into subsections for each subsequent iteration. Further, in some implementations, a different divider may be used, for each subsequent iteration of dividing the section into subsection. For example, a first iteration may divide the section in half and a second iteration may divide the section into thirds or a first iteration may divide the section into fifths and a second iteration may divide the section into eighths, and/or the like.

In some implementations, the speed planning device may determine or identify subsections of the section that are not an equal length for a particular iteration. For example, the speed planning device may determine that an iteration of a speed planning analysis for a section may divide the section into relatively shorter subsections for portions of the section that include a threshold number of elevation changes or slope changes and relatively longer sections for portions of the section that do not include the threshold number of elevation changes or slope changes. Accordingly, for a speed analysis of a section, the lengths of the subsections may vary within and/or across iterations of determining the subsections of the section and calculating candidate speeds for the subsections.

In some implementations, a similar speed analysis may be performed for curves in the route. For example, a curve may be detected within a section (or subsection) of the route and/or a curve may be detected across multiple sections (or subsections) of the route. The curve may be detected based on geolocation coordinates of the route. In such cases, an estimated radius associated with a curve of the section and the length of the section may correspond to the slope of a section and the length of the section, as described herein. Accordingly, the speed planning device may generate a speed plan to permit the vehicle to traverse curves in the route according to one or more parameters of the vehicle and based on one or more operating characteristics of the vehicle, as described herein.

In this way, the speed planning device may perform a speed planning analysis of a section of a route by iteratively determining subsections of the section and calculating candidate speeds for the subsections based on slopes of the subsections. The speed planning device may then select speeds, from the candidate speeds, for a speed plan for the section.

As indicated above, FIG. 2 is provided as an example. Other examples may differ from what is described in connection with FIG. 2.

Figure 3:
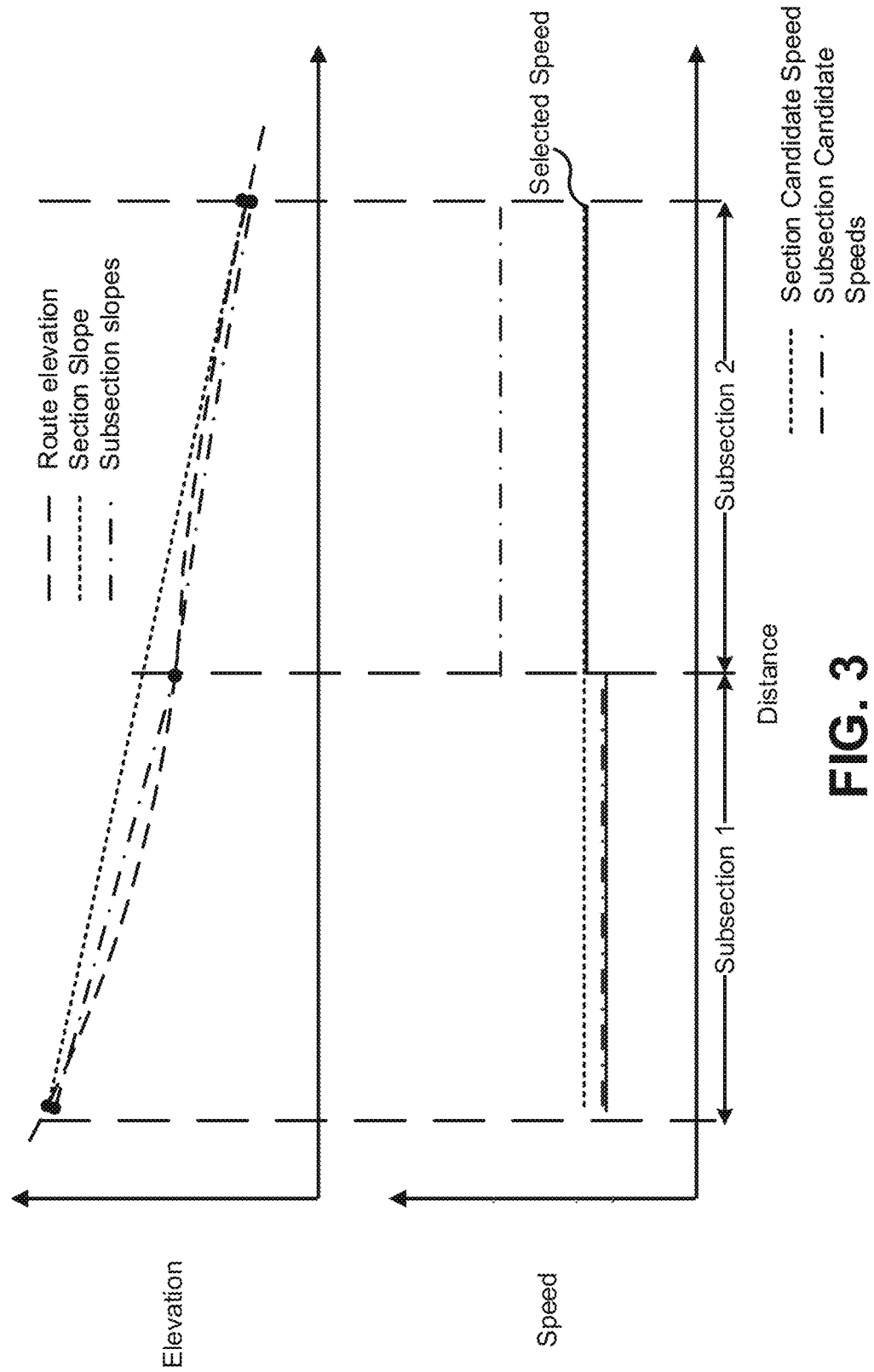
Figure 4:
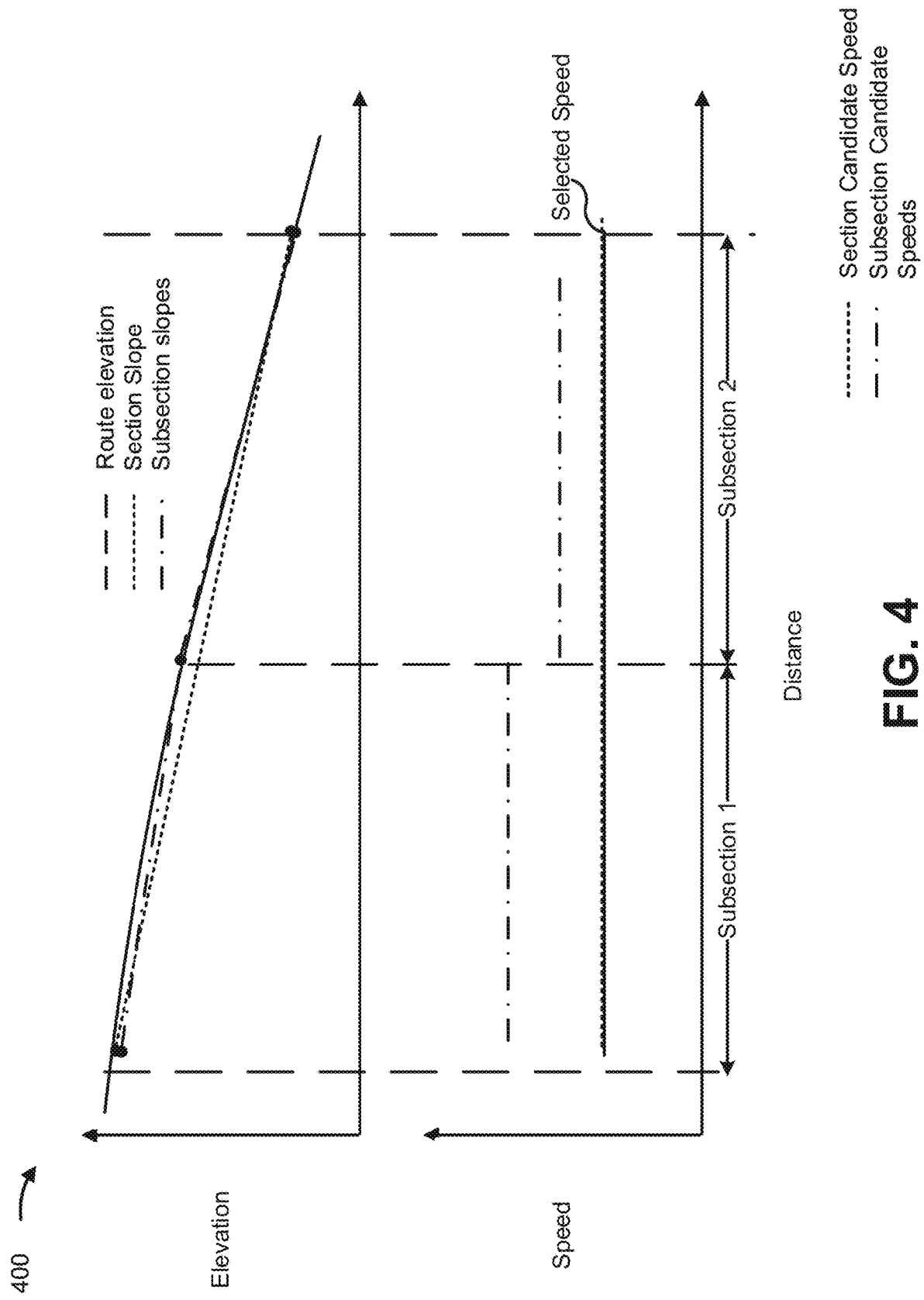
Figure 5:
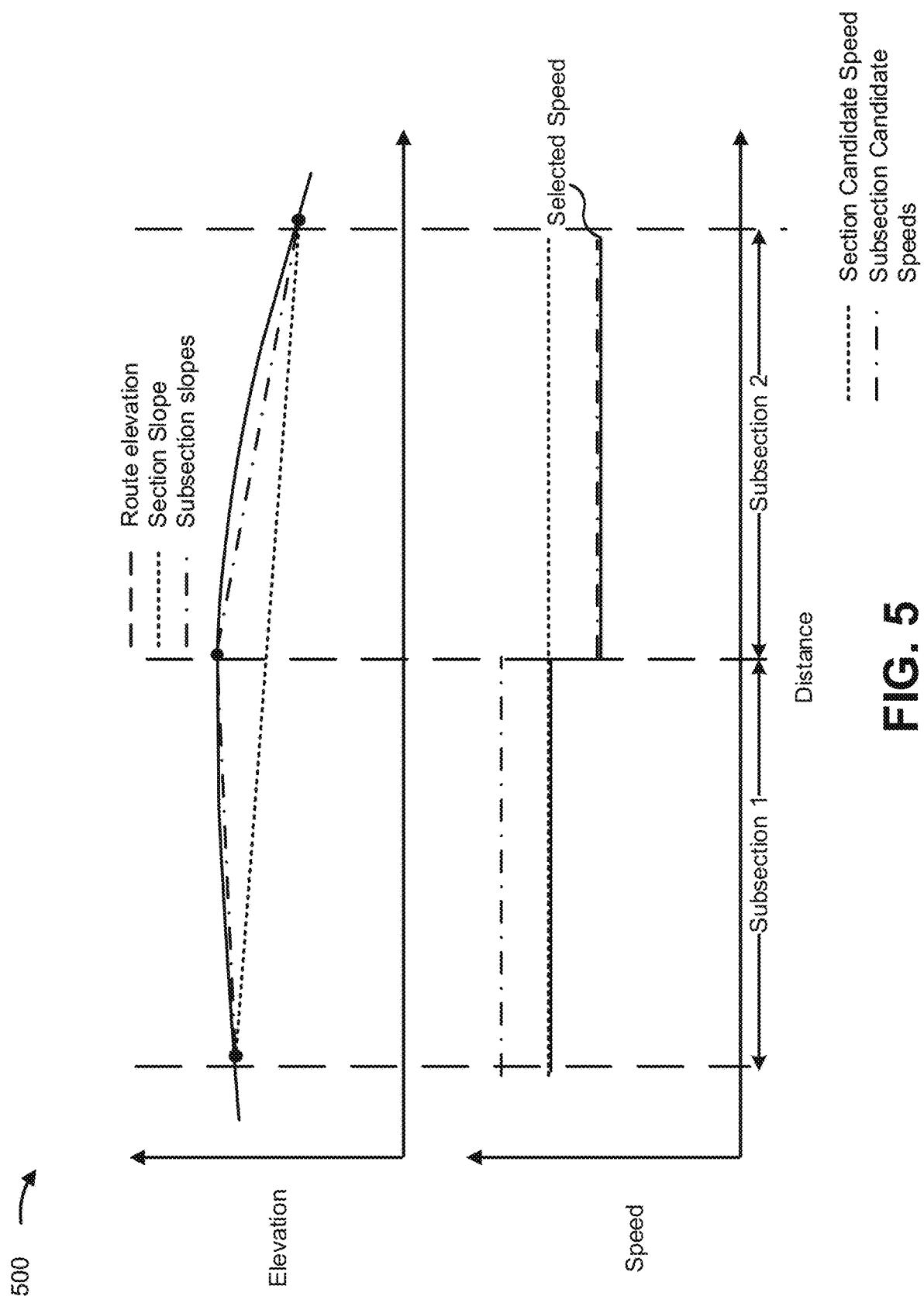

FIGS. 3-5 are diagrams of example implementations 300, 400, 500 associated with speed planning for a vehicle described herein. In FIGS. 3-5, a speed planning analysis may be performed for example sections of a route that is to be traversed by a vehicle. The speed planning analysis is represented by a first graph of elevation versus distance and a second graph of speed versus distance, such that a distance of the first graph corresponds to a distance of the second graph.

In FIGS. 3-5, the first graph includes a route elevation (dashed line), a section slope (dotted line), and subsection slopes (dotted/dashed lines). The route elevation corresponds to the elevation of the route, which may be indicated in elevation information by the route information system. The section slope is a calculated slope of the section of the route in example implementations 300, 400, 500. The subsection slopes are calculated slopes of subsection 1 and subsection 2, which are subsections of the section of the route. Subsection 1 and subsection 2 may have been determined by the speed planning device in accordance with speed planning analysis of example implementation 200 and/or by a speed planning model trained by the speed planning device.

In FIGS. 3-5, the second graph includes a section candidate speed (dotted line), subsection candidate speeds (dotted/dashed lines), and a selected speed (solid line). The section candidate speed is a candidate speed calculated based on the section slope and the subsection candidate speeds are respective candidate speeds calculated for subsection 1 and subsection 2 based on the slopes of subsection 1 and subsection 2 (which may be referred to herein as "candidate speed for subsection 1" and "candidate speed for subsection 2"). As shown, the section candidate speed and the candidate speed for subsection 1 may be considered overlapping candidate speeds in that both candidate speeds may be selected for subsection 1. Similarly, the section candidate speed and the candidate speed for subsection 2 may be considered overlapping in that both candidate speeds may be selected for subsection 2. The selected speed of FIGS. 3-5 is a speed that is selected for a speed plan generated by the speed planning device, as described herein.

The speed planning analysis of example implementations 300, 400, 500 may be performed by a speed planning device, such as the speed planning device of FIG. 1, to select a speed for the vehicle to traverse each subsection of the example subsections of the route. The speed planning device may perform the speed planning analysis of example implementations 300, 400, 500, in conjunction with the speed planning analysis described in example implementation 200 and/or using the speed planning model described herein. Furthermore, the speed planning device may include the selected speed in a speed plan that the vehicle is to use to traverse the route.

As shown in the first graph of example implementation 300 of FIG. 3, the section includes a concave decline with various slopes. Therefore, the section slope is less steep than the slope of subsection 1 and steeper than the slope of subsection 2. Correspondingly, as shown in the second graph of example implementation 300, the candidate speed for subsection 1 is slower than the section candidate speed and the candidate speed for subsection 2 is faster than the section candidate speed. According to some implementations, the speed planning device may be configured to select a slowest candidate speed for each identified subsection of a section of a route. For example, the speed planning device may be configured to select the slowest speed to maintain one or more parameters associated with the vehicle and/or optimize one or more performance characteristics of the vehicle. Therefore, as shown, the speed planning device may select the candidate speed for subsection 1 as the speed for subsection 1 and the section candidate speed for subsection 2 as the speed for subsection 2.

Therefore, from the speed planning analysis in example implementation 300, the speed planning device may add the candidate speed for subsection 1 to the speed plan to cause the vehicle to traverse subsection 1 of the route as the candidate speed for subsection 1. Furthermore, the speed planning device may also add the section candidate speed to the speed plan to cause the vehicle to traverse (or at least plan to traverse) subsection 2 of the route at the section candidate speed. Therefore, according to example implementation 300, the speed planning analysis may detect a steep decline and maintain a relatively slow speed (e.g., to preserve a life span of the vehicle or a component of the vehicle) of the vehicle despite the vehicle approaching a less steep decline, which could typically indicate a more drastic acceleration of the vehicle.

As shown in the first graph of example implementation 400 of FIG. 4, the section includes a convex decline with various slopes. Therefore, the section slope is steeper than the slope of subsection 1 and less steep than the slope of subsection 2. Correspondingly, as shown in the second graph of example implementation 400, the section candidate speed may be slower than the candidate speed for subsection 1 and the candidate speed for subsection 2 (e.g., due to the longer and steeper slope of the section). Similar to example implementation 300, the speed planning device may be configured to select a slowest candidate speed for each identified subsection of a section of a route. Therefore, as shown, the speed planning device may select the section candidate speed as the speeds for subsection 1 and subsection 2.

Accordingly, from the speed planning analysis in example implementation 400, the speed planning device may add the section candidate speed for subsection 1 to the speed plan to cause the vehicle to traverse subsection 1 of the route at the section candidate speed. Furthermore, the speed planning device may also add the section candidate speed to the speed plan to cause the vehicle to traverse (or at least plan to traverse) subsection 2 of the route at the section candidate speed. As shown in example implementation 400, the speed planning analysis may detect an upcoming steeper decline and slow the speed of the vehicle despite the vehicle being on less steep decline.

As shown in the first graph of example implementation 500 of FIG. 5, the section includes an incline and a decline. In the section of example implementation 500, the incline is less steep than the decline and the apex of the incline and decline are at a point that is essentially between subsection 1 and subsection 2. Therefore, as shown in the first graph, the section slope is a decline that is less steep than the decline of subsection 2. Correspondingly, as shown in the second graph of example implementation 500, the section candidate speed may be slower than the candidate speed for subsection 1 and faster than the candidate speed for subsection 2. Similar to example implementation 300 and 400, the speed planning device may be configured to select a slowest candidate speed for each identified subsection of a section of a route. Therefore, as shown, the speed planning device may select the section candidate speed as the speed for subsection 1 and the candidate speed for subsection 2 as the speed for subsection 2.

Therefore, from the speed planning analysis in example implementation 500, the speed planning device may add the section candidate speed for subsection 1 to the speed plan to cause the vehicle to traverse subsection 1 of the route at the section candidate speed. Furthermore, the speed planning device may also add the candidate speed for subsection 2 to the speed plan to cause the vehicle to traverse (or at least plan to traverse) subsection 2 of the route at the section candidate speed. As shown in example implementation 500, the speed planning analysis may detect the upcoming decline and slow the speed of the vehicle despite the vehicle being on an incline.

As indicated above, FIGS. 3-5 are provided as examples. Other examples may differ from what is described in connection with FIGS. 3-5. For example, although example implementations 300, 400, 500 show a single iteration of calculating candidate speeds for subsections of the section, one or more additional iterations may be performed in the speed planning analysis of example implementations 300, 400, 500.

Figure 6:
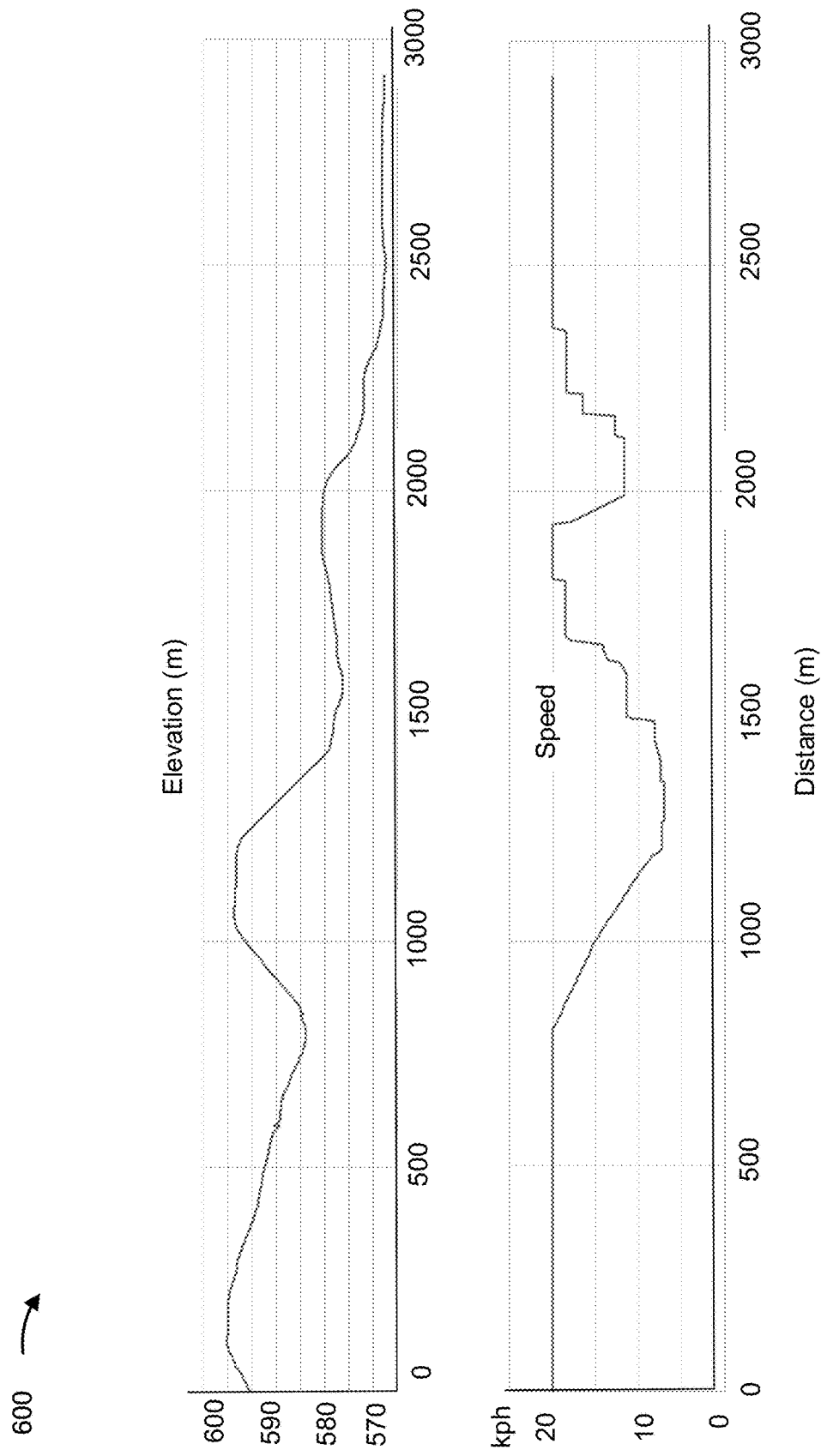

FIG. 6 is a diagram of an example implementation 600 associated with speed planning for a vehicle described herein. In FIG. 6, elevation of a route (having a distance from 0 to 3000 meters (m)) is represented in a first graph and a sample of speeds of a vehicle traversing the elevation are represented in a second graph of speed versus distance. The sample of speeds may correspond to sample operating speeds of a vehicle controlled by a vehicle control device according to one or more speed plans generated and provided, as described herein.

As shown in the second graph, the speed of the vehicle may be increased and/or decreased according to the elevation at that point. As a specific example, the speed planning device may generate speed plans indicating that, as the vehicle approaches the summit of a hill between 1000 m and 1500 m, the vehicle is to slow down (e.g., from approximately 20 kilometers per hour (kph) to approximately 5 kph). The speed planning device may then generate speed plans according to the elevation that enable the vehicle to accelerate until a decline at approximately 2000 m. The speed plans may then indicate that the vehicle is to slow from approximately 20 kph to approximately 10 kph to descend the decline and then accelerate back to 20 kph after the decline.

In this way, one or more speed plans may be generated and provided to enable a speed of a vehicle to be controlled as the vehicle traverses a route. As indicated above, FIG. 6 is provided as an example. Other examples may differ from what is described in connection with FIG. 6.

Figure 7:
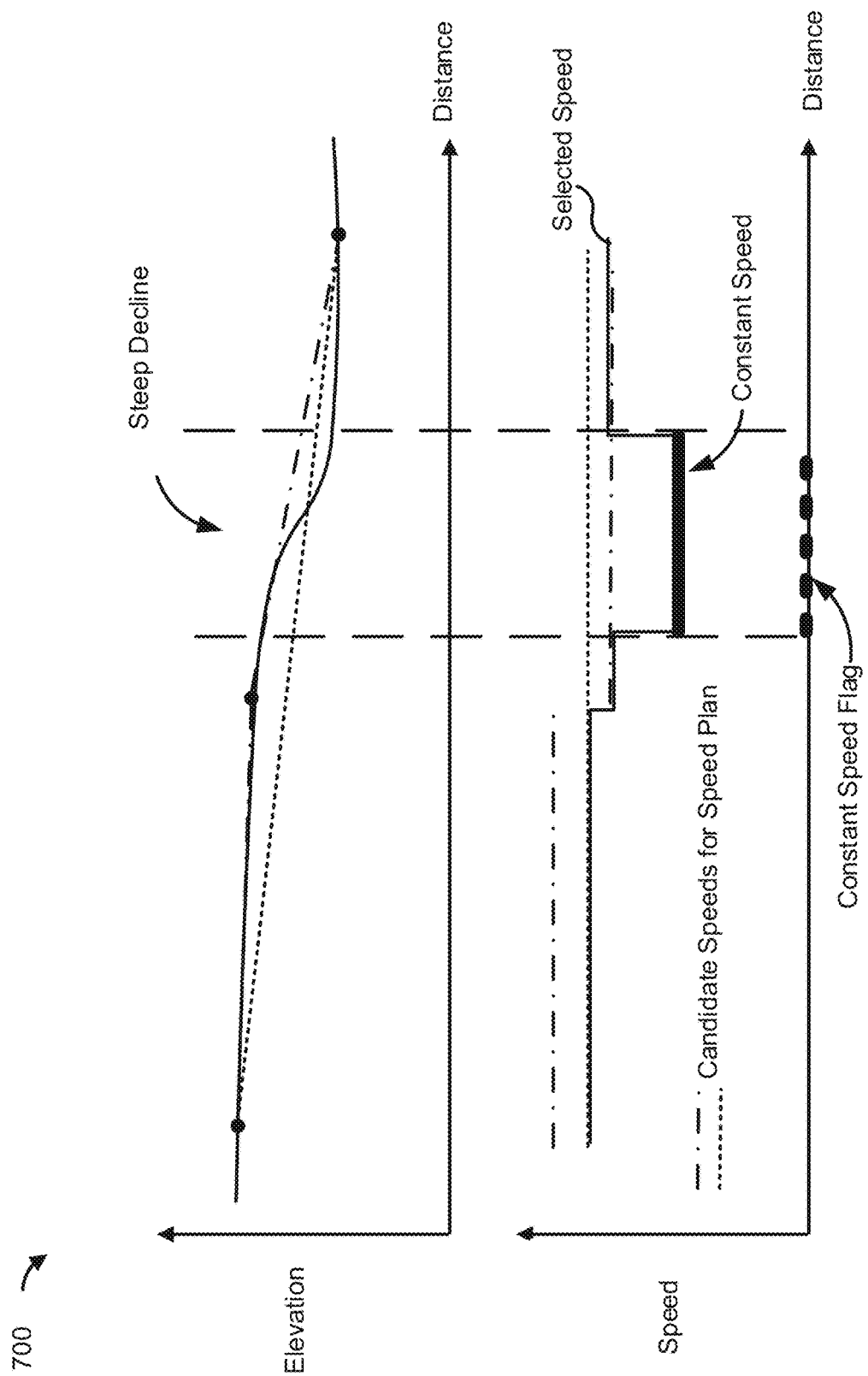

FIG. 7 is a diagram of an example implementation 700 associated with speed planning for a vehicle described herein. In FIG. 7, a speed planning analysis may be performed for an example section of a route that is to be traversed by a vehicle. Similar to example implementations 300, 400, and 500, the speed planning analysis of example implementation 700 is represented by a first graph and second graph and may be performed by a speed planning device. The speed planning analysis of example implementation 700 includes a steep decline analysis. As described herein, the steep decline analysis may be performed by the speed planning device to enable the speed planning device to set a constant speed for the vehicle to descend a steep decline (e.g., a decline that has a slope exceeding a defined threshold). In some implementations, the speed planning device may perform the steep decline analysis using a speed planning model described herein.

As described herein, the speed planning device may iteratively generate and provide speed plans to a vehicle control device to permit the vehicle control device to control the speed of the vehicle as the vehicle traverses a route. Accordingly, a speed plan may indicate that the vehicle control device is to increase and/or decrease speed relative to a previously provided speed plan. Furthermore, speed plans, provided over time, may indicate different speeds at which the vehicle is to traverse a same point or section along the route (e.g., because the section analyzed for each speed plan is a sliding window along the route). In some implementations, a section-by-section speed planning analysis, as described herein, may not detect a steep decline within a section or subsection (e.g., due to the section-by-section speed planning analysis having insufficient granularity).

Accordingly, as shown in example implementation 700, the speed planning device may perform a steep decline analysis (e.g., in parallel to a speed planning analysis as described herein) to detect a steep decline along the route and/or set a constant speed for the vehicle to traverse the steep decline. In some implementations, the speed planning device may detect the steep decline based on an analysis of the elevation. For example, the speed planning device may identify elevations along the route and calculate slopes of declines along the route (e.g., using elevations of pairs of points and distances between the pairs of points), compare the slopes to the threshold slope for a steep decline, and determine that one or more declines are steep declines if the slopes satisfy the steep decline threshold. Additionally, or alternatively, the speed planning device may detect a steep decline based on one or more sensors (e.g., an accelerometer and/or gyroscope that detects inclines or declines on a route) of a vehicle associated with the speed planning device (e.g., a vehicle that traverses the route according to a speed plan generated by the speed planning device).

As shown in FIG. 7, the speed planning device may set, in a speed plan, a constant or maximum speed for points along the steep decline without regard to candidate speeds calculated for the same points using a speed planning analysis (e.g., a section-by-section speed planning analysis), as described herein. In some implementations, the speed planning device may calculate the constant or maximum speed for the steep decline based on the slope of the steep decline and/or length of the steep decline. In some implementations, the speed planning device may maintain a mapping of constant or maximum speeds for the steep declines and/or may flag points along the route where the speed of the vehicle is to be constant (or less than the maximum) according to the steep decline analysis (e.g., similar to the route information identifying speed limits and/or fixed speed regulations for certain points along the route). In FIG. 7, a constant/maximum speed flag is represented by a large dotted line along the distance of the steep decline. Accordingly, the speed planning device may reference the mapping and/or flagged points along the route when generating speed plans for sections of the route that include the steep declines.

Accordingly, for a section of a route that includes a steep decline, the speed planning device may set a constant or maximum speed at which the vehicle is to descend the steep decline. In other words, the speed planning device may ignore candidate speeds calculated for points along the steep decline, based on the steep decline analysis of example implementation 700.

As indicated above, FIG. 7 is provided as an example. Other examples may differ from what is described in connection with FIG. 7.

Figure 8:
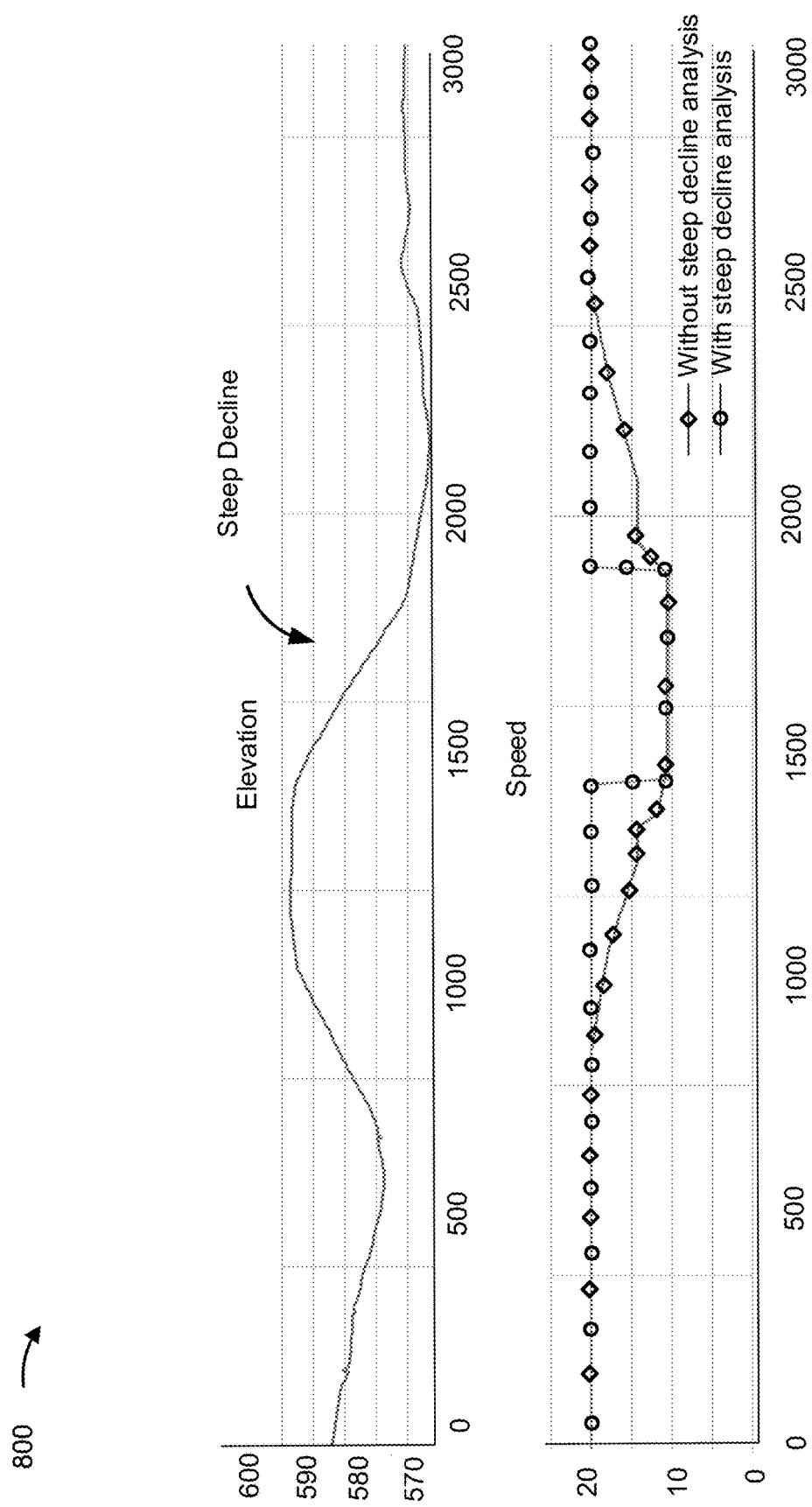

FIG. 8 is a diagram of an example implementation 800 associated with speed planning for a vehicle described herein. In FIG. 8, elevation of a route (having a distance 0 to 3000 meters (m)) is represented in a first graph and two samples of speeds of a vehicle traversing the elevation are represented in a second graph of speed versus distance.

In the second graph of example implementation 800, the first sample of speeds (shown with diamonds) corresponds to the operating speed of a vehicle as the vehicle traversed the elevation without the speed planning device performing a steep decline analysis, as at least described above in connection with FIG. 7. In some implementations, the vehicle may have traversed the elevation at speeds represented by the first sample according to a speed plan generated without a steep decline analysis, as described above in connection with FIGS. 2-6. The second sample of speeds (shown with circles) corresponds to the operating speed of a vehicle as the vehicle traverses the elevation using a steep decline analysis, along with a section-by-section speed planning analysis as at least described above in connection with FIGS. 2-6. As shown, according to the steep decline analysis, the vehicle may maintain a standard operating speed until a steep decline, decrease the speed to a constant speed (or a speed below a maximum) as the vehicle descends the steep decline, and accelerate back to the standard speed after the steep decline.

In some implementations, the speed planning device (e.g., using the speed planning model) may run the speed planning analysis used to control the first sample of speeds and the steep decline analysis used to control the second sample of speeds in parallel. Accordingly, the speed planning device may set speeds for a speed plan for certain portions of the route using the speed plan analysis and/or the steep decline analysis. For example, the speed planning device may switch from using the speed planning analysis to the steep decline analysis to set speeds in a speed plan for steep declines in the route, and use the speed planning analysis to set speeds in the speed plan for other parts of the route.

As indicated above, FIG. 8 is provided as an example. Other examples may differ from what is described in connection with FIG. 8.

Figure 9:
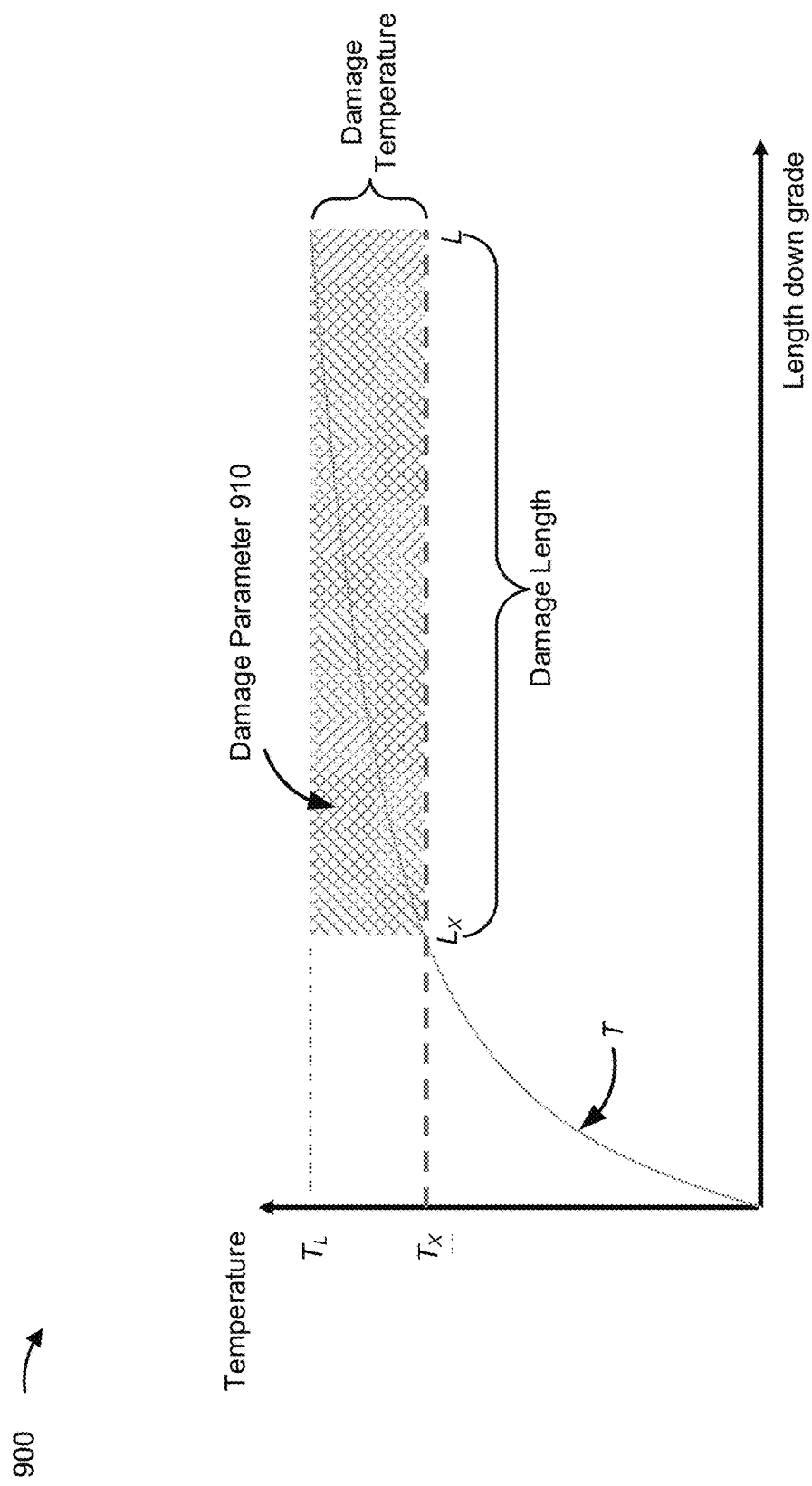

FIG. 9 is a diagram of an example implementation 900 associated with speed planning for a vehicle described herein. In FIG. 9, a graph of temperature versus length downgrade (e.g., a distance along a section or subsection) includes a two-dimensional parameter 910 (which may be referred to herein as "the damage parameter") that is to be maintained by a vehicle as the vehicle traverses a section of the route. As shown, a temperature associated with the vehicle and/or a mechanism of the vehicle (e.g., a braking mechanism) is to be maintained within the area defined by the damage parameter 910. Accordingly, a speed planning device, as described herein, may use the damage parameter 910 as indicated in FIG. 9 to calculate one or more candidate speeds at which a vehicle may traverse a section and/or subsection of a route.

As shown in FIG. 9, the damage parameter 910 is a two-dimensional parameter (an area on the graph) defined by a damage temperature range ($T_L$–$T_X$) and a damage length (L–$L_X$). In some implementations, a speed planning device is to calculate candidate speeds that would maintain the temperature T within the damage parameter. According to some implementations, the speed planning device may use a speed calculation model to calculate candidate speeds for a speed planning analysis, as described herein. For example, assume the temperature T is associated with a braking mechanism of the vehicle. Defining the area D of the damage parameter 910 as:

$$D = (T_L - T_X)(L - L_X) \text{ where} \qquad (1)$$

$$T_L = T_{water} + \frac{vmgG}{\beta}\left[e^{-\frac{\beta L}{Hv}} - 1\right] \text{ and} \qquad (2)$$

$$L_X = -\frac{Hv}{\beta}\ln\left[\frac{(T_X - T_{water})\beta}{vmgG} + 1\right] \qquad (3)$$

where $T_{water}$ is the temperature (which is typically constant) of a coolant used to cool the braking mechanism, $\beta$ is a constant corresponding to a heat rejection of the braking mechanism, H is a constant corresponding to a heat capacity of the braking mechanism, m is a mass associated with the vehicle (e.g., the mass of the vehicle), g is a constant associated with gravity, G is a grade (which may be a decline defined by an angle θ, where G=sin θ), L is the section (or subsection) length, and v is a candidate speed to be calculated for the section (or subsection). Accordingly, values for $T_L$ and $L_X$ can be set (e.g., according to a user input, a characteristic of the braking mechanism, a performance characteristic for the braking mechanism, and/or the like). Using Equation 2 and Equation 3, the speed planning device can solve for candidate speeds v that satisfy the damage parameter 910 (e.g., using a root-finding analysis, such as a Newton-Raphson analysis, and/or the like).

According to some implementations, the speed calculation model may be a machine learning model of the speed planning model described herein. For example, the speed planning device may train the speed calculation model based on one or more speed calculation parameters associated with calculating a candidate speed for a vehicle, such as one or more characteristics of the vehicle (e.g., the mass of the vehicle, a load of the vehicle, a configuration of the vehicle, a location of the vehicle, and/or the like), one or more parameters of the vehicle (e.g., a brake temperature of the vehicle, an engine coolant temperature of the vehicle, a heat rejection rate associated with a brake of the vehicle, a heat capacity associated with the brake of the vehicle, and/or the like), a slope of the section, a length of the section, and/or the like. The speed planning device may train the speed calculation model using historical data associated with calculating candidate speeds for the vehicle and/or one or more other vehicles according to the one or more speed calculation parameters. Using the historical data and the one or more speed calculation parameters as inputs to the speed calculation model, the speed planning device may calculate candidate speeds for the vehicle in order to generate a speed plan for the vehicle, as described herein. In some implementations, using the historical data and the one or more speed calculation parameters as inputs to the speed calculation model, the speed planning device may determine values for $T_L$ and $L_X$ to determine appropriate thresholds for the damage parameter 910 of the braking mechanism (and/or other component of the vehicle). For example, the speed planning device may determine, from the speed calculation model and/or speed planning model, a maximum value for $T_L$ and/or $L_X$ that do not cause failure to the braking mechanism.

Accordingly, the damage parameter 910 may be used to determine a threshold temperature and a threshold length down grade that is to be satisfied for candidate speeds calculated by the speed planning device.

According to some implementations, in the speed calculation model, the temperature T of FIG. 9 may be defined as T(t) according to the following:

$$T(t) = T_{water} - \frac{vmgG}{\beta} + \left[T_0 - T_{water} + \frac{vmgG}{\beta}\right]e^{-\frac{\beta}{Hv}t} \qquad (4)$$

where $T_0$ is the temperature at time t=0. Accordingly, the temperature T may vary over time (e.g., during operation, over the life of the braking mechanism, and/or the like).

In some implementations, rather than using the damage parameter 910 as a threshold for the temperature of the braking mechanism, a one-dimensional threshold temperature $T_{max}$ (e.g., corresponding to $T_X$ in the graph of FIG. 9). In such cases, the threshold temperature $T_{max}$ may be defined as follows:

$$T_{max} = T_{water} - \frac{vmgG}{\beta} + \left[T_0 - T_{water} + \frac{vmgG}{\beta}\right]e^{-\frac{\beta L}{Hv}} \qquad (5)$$

where the candidate speed v may be determined as function of mass m, grade G, and section or subsection length L.

In this way, the speed planning device may calculate one or more candidate speeds using one or more parameters associated with the vehicle and/or a component of the vehicle.

As indicated above, FIG. 9 is provided as an example. Other examples may differ from what is described in connection with FIG. 9.

Figure 10:
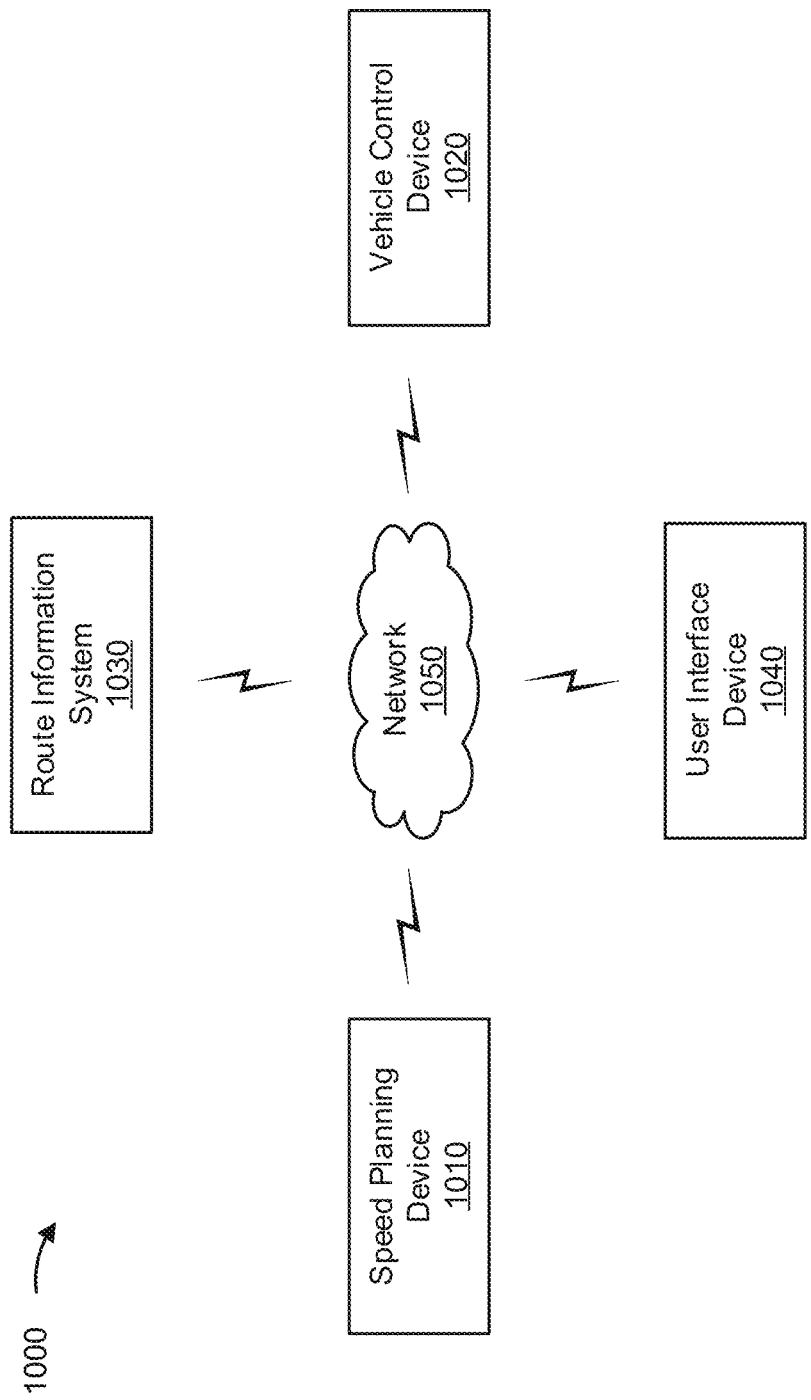
FIG. 10 is a diagram of an example environment in which systems and/or methods, described herein, may be implemented.

FIG. 10 is a diagram of an example environment 1000 in which systems and/or methods, described herein, may be implemented. As shown in FIG. 10, environment 1000 may include a speed planning device 1010, a vehicle control device 1020, a route information system 1030, and/or a user interface device 1040. Devices of environment 1000 may interconnect via wired connections, wireless connections, or a combination of wired and wireless connections. Devices of environment 1000 may be configured to generate a speed plan for and/or control a vehicle.

Speed planning device 1010 may include one or more devices and/or mechanisms capable of receiving, generating, processing, and/or providing information associated with generating a speed plan for a vehicle to traverse a route. For example, speed planning device may include a smartphone, a desktop computer, a tablet device, a server, and/or the like. In some implementations, speed planning device 1010 may be implemented as a platform hosted within a cloud computing environment. In some implementations, speed planning device 1010 may be cloud-based, non-cloud-based, and/or partially cloud-based. Speed planning device 1010 of FIG. 10 may correspond to a speed planning device as described above in connection with FIGS. 1-9.

Vehicle control device 1020 may include one or more devices and/or mechanisms capable of receiving, generating, processing, and/or providing information associated with a vehicle and/or associated with controlling a vehicle. Vehicle control device 1020 may include one or more sensors (e.g., mass sensors (e.g., scales), speed sensors, accelerometers, gyroscopes, fluid sensors, pressure sensors, position sensors, fuel sensors, and/or the like) that identify one or more operating characteristics of the vehicle and/or one or more parameters associated with the vehicle. Additionally, or alternatively, vehicle control device 1020 may include one or more control devices and/or systems to control the speed and/or direction of the vehicle. For example, vehicle control device 1020 may include a mechanical braking mechanism, a mechanical transmission, an electric drive, an acceleration system, a steering system, and/or the like. Vehicle control device 1020 may correspond to a vehicle control device as described above in connection with FIGS. 1-9.

Route information system 1030 may include one or more devices capable of receiving, generating, storing, processing, and/or providing information associated with a route to speed planning device 1010. For example, route information system 1030 may include a global positioning system (GPS), a navigation system, a mapping system, a topography system, a ground surface information system, and/or the like. Route information system 1030 may identify and/or provide information (e.g., elevation information, distance information, surface condition information, and/or the like) associated with a location of the vehicle and/or a route that the vehicle is to traverse. In some implementations, route information system 1030 may provide the route information to speed planning device 1010 to permit speed planning device 1010 to generate a speed plan for a vehicle. Route information system 1030 may correspond to a route information system as described above in connection with FIGS. 1-9.

User interface device 1040 may include one or more devices capable of receiving, generating, storing, processing, and/or providing information associated with a user input associated with generating a speed plan for a vehicle. Such a user input may enable a user to adjust one or more settings and/or configurations of speed planning device 1010. For example, user interface device 1040 may include a mobile phone (e.g., a smart phone, a radiotelephone, etc.), a laptop computer, a tablet computer, a handheld computer, a wearable communication device (e.g., a smart wristwatch, a pair of smart eyeglasses, etc.), or a similar type of device. In some implementations, the user interface device 1040 may correspond to one or more user input devices of an operator station of a vehicle. Accordingly, a user may be able to provide input associated with generating a speed plan for a vehicle to traverse a route using user interface device 1040.

One or more devices of environment 1000 (e.g., speed planning device 1010, vehicle control device 1020, route information system 1030, or user interface device 1040) is implemented as a processor, such as a central processing unit (CPU), an accelerated processing unit (APU), a microprocessor, a microcontroller, a digital signal processor (DSP), a field-programmable gate array (FPGA), an application-specific integrated circuit (ASIC), or another type of processing component. The processor is implemented in hardware, firmware, and/or a combination of hardware and software. In some implementations, one or more of the devices includes one or more processors capable of being programmed to perform a function. In some implementations, the one or more devices may include one or more memories, including a random access memory (RAM), a read only memory (ROM), and/or another type of dynamic or static storage device (e.g., a flash memory, a magnetic memory, and/or an optical memory) that may store information and/or instructions for use by the one or more devices. In some implementations, one or more devices of environment 1000 may include a memory (e.g., a non-transitory computer-readable medium) capable of storing instructions, that when executed, cause the processor to perform one or more processes and/or methods described herein. A computer-readable medium is defined herein as a non-transitory memory device. A memory device includes memory space within a single physical storage device or memory space spread across multiple physical storage devices. The one or more devices may execute the instructions to perform various control functions and processes (e.g., associated with generating, providing, and/or using a speed plan for a vehicle).

Network 1050 includes one or more wired and/or wireless networks. For example, network 1050 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks. While example environment 1000 is described to include network 1050, in some implementations, one or more of the devices of environment 1000 are connected to one another without a network connection (e.g., via a direct wired or wireless connection).

The number and arrangement of devices and networks shown in FIG. 10 are provided as an example. In practice, there may be additional devices and/or networks, fewer devices and/or networks, different devices and/or networks, or differently arranged devices and/or networks than those shown in FIG. 10. Furthermore, two or more devices shown in FIG. 10 may be implemented within a single device, or a single device shown in FIG. 10 may be implemented as multiple, distributed devices. Additionally, or alternatively, a set of devices (e.g., one or more devices) of environment 1000 may perform one or more functions described as being performed by another set of devices of environment 1000.

In some implementations, one or more devices shown in FIG. 10 may be collocated on a same vehicle. For example, environment 1000 may correspond to a system of a vehicle. Additionally, or alternatively, one or more of the devices shown in FIG. 10 may be remotely located from a vehicle that includes one or more remaining devices of environment 1000. For example, the vehicle may be a vehicle under operation at a work site. In such an example, vehicle control device 1020 may be located on the vehicle and speed planning device 1010, route information system 1030, and/or user interface device 1040 may be partially or entirely remotely located in a device (e.g., a server device) of a control station of the work site and/or in a device of a remote office associated with an organization that operates the work site.

Figure 11:
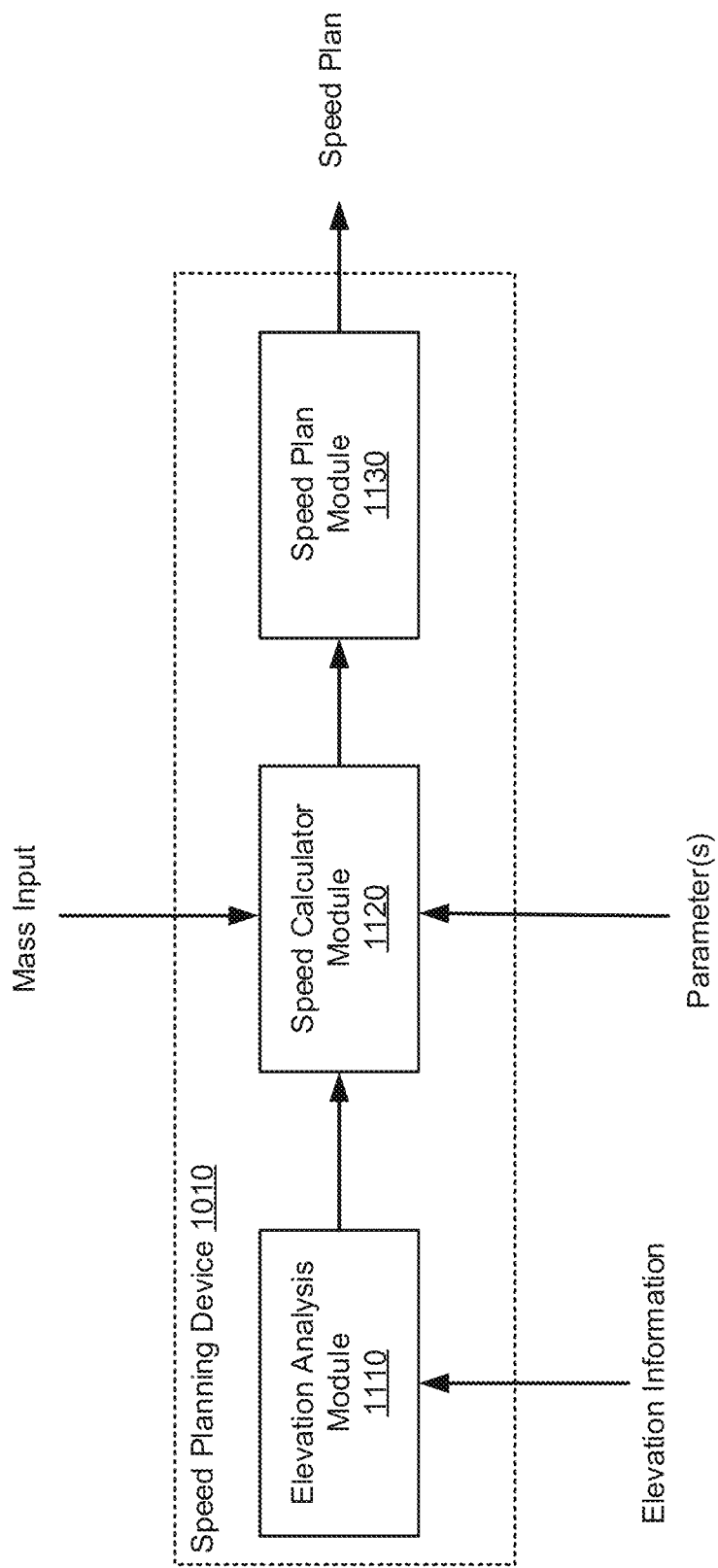
FIG. 11 is a diagram of an example implementation of a speed planning device described herein.

FIG. 11 is a diagram of an example implementation of a speed planning device 1010 described herein. Speed planning device 1010 of FIG. 11 may include an elevation analysis module 1110, a speed calculator module 1120, and a speed plan module 1130.

Elevation analysis module 1110 may include one or more devices configured to perform an analysis of elevation information for a speed plan generated by speed planning device 1010, as described herein. As shown, elevation analysis module 1110 may be included within and/or implemented by speed planning device 1010. Elevation analysis module 1110 may receive elevation information from route information system 1030. In some implementations, elevation analysis module 1110 may identify an elevation of the route based on determining coordinates of points along the route and identifying an elevation (e.g., an altitude) at the coordinates along the route. In some implementations, elevation analysis module 1110 may be configured to detect and/or measure slopes between two points of the route (e.g., between a start point and an end point of a section of the route, between a start point and an end point of a subsection of a section of the route, and/or the like). In some implementations, elevation analysis module 1110 may be configured to identify a steep decline in a route based on the measured or estimated slope of the steep decline satisfying a threshold.

Speed calculator module 1120 may include one or more devices configured to calculate candidate speeds for a speed plan generated by speed planning device 1010, as described herein. As shown, speed calculator module 1120 may be included within and/or implemented by speed planning device 1010. Speed calculator module 1120 may calculate one or more candidate speeds for a speed plan based on a mass of a vehicle, a slope of a section or subsection, and/or a length of the section and/or subsection. In some implementations, speed calculator module 1120 may receive and/or determine the mass based on a user input, a default value for the vehicle (e.g., corresponding to a known mass of the vehicle), and/or information from one or more sensors (e.g., a scale, a pressure sensor, and/or the like) of vehicle control device 1020. In some implementations, speed calculator module 1120 may receive the slope of a section or subsection and/or a length of the section and/or subsection from elevation analysis module 1110. In some implementations, speed plan module 1130 may calculate candidate speeds for a section and/or subsection of a route using a speed calculation model, as described herein.

Speed plan module 1130 may include one or more devices configured to select speeds for a speed plan generated by speed planning device 1010, as described herein. As shown, speed plan module 1130 may be included within and/or implemented by speed planning device 1010. Speed plan module 1130 may receive candidate speeds for a section of a route from speed calculator module 1120. In some implementations, speed plan module 1130 may select a slowest of the candidate speeds for a particular section and/or subsection of the route. In some implementations, speed plan module 1130 may store and/or select preconfigured speeds (e.g., as set by a speed limit and/or fixed speed regulation of the route) and/or may store and/or select constant or maximum speeds (e.g., a constant speed for a decline) for one or more points of a route, as described herein.

In some implementations, speed plan module 1130 is configured to generate and provide the speed plan to vehicle control device 1020. In some implementations, the speed plan may be generated as data that is to be provided to vehicle control device 1020. Additionally, or alternatively, the speed plan may be included within a message. Accordingly, the speed plan module 1130 may generate the message and provide the speed plan within the message to the vehicle control device 1020. In some implementations, the speed plan may include a mapping (or any other suitable data format, such as a table, a graph, and/or the like) of speeds at which the vehicle control device 1020 is to control the vehicle at particular points and/or sections along the route.

As shown in FIG. 11, speed planning device 1010 of FIG. 11 may output a speed plan. One or more of the modules of speed planning device 1010 may be implemented by and/or controlled by a speed planning model as described herein. As described herein, the speed plan may be provided to a vehicle (e.g., an operator-controlled vehicle, an autonomous vehicle, a semi-autonomous vehicle, and/or the like) to permit the vehicle to traverse a route according to the speed plan.

As indicated above, FIG. 11 is provided as an example. Other examples may differ from what is described in connection with FIG. 11. As used herein, the term "module" is intended to be broadly construed as hardware, firmware, or a combination of hardware and software.

Figure 12:
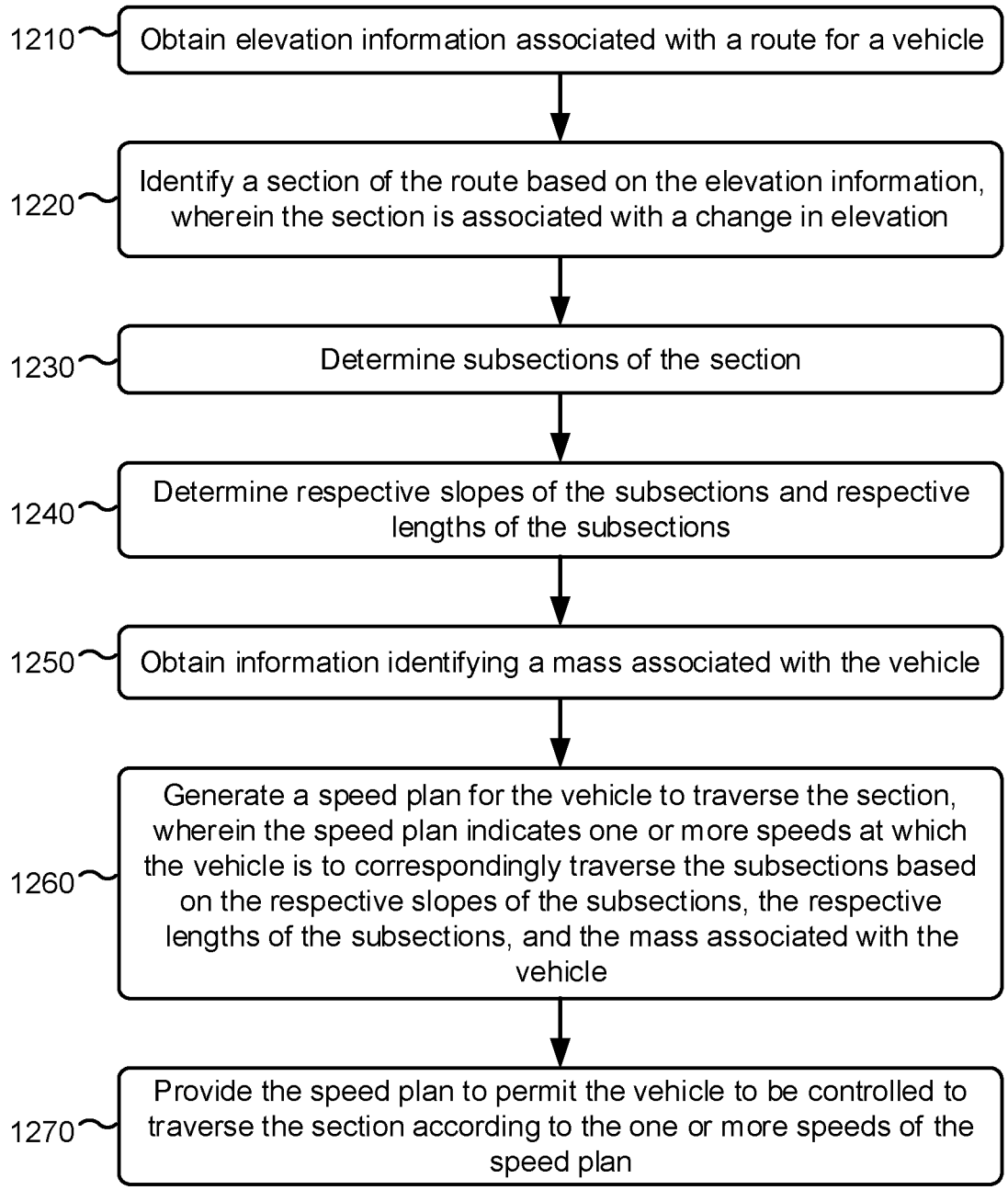
FIG. 12 is a flow chart of an example process associated with speed planning for a vehicle.

FIG. 12 is a flow chart of an example process 1200 associated with speed planning for a vehicle. In some implementations, one or more process blocks of FIG. 12 may be performed by a speed planning device (e.g., speed planning device 1010). In some implementations, one or more process blocks of FIG. 12 may be performed by another device or a group of devices separate from or including the speed planning device, such as a vehicle control device (e.g., vehicle control device 1020), a route information system (e.g., route information system 1030), a user interface (e.g., user interface device 1040), and/or the like.

As shown in FIG. 12, process 1200 may include obtaining elevation information associated with a route for a vehicle (block 1210). For example, the speed planning device (e.g., using elevation analysis module 1110, and/or the like) may obtain elevation information associated with a route of a vehicle, as described above.

As further shown in FIG. 12, process 1200 may include identifying a section of the route based on the elevation information, wherein the section is associated with a change in elevation (block 1220). For example, the speed planning device, (e.g., using elevation analysis module 1110, speed calculator module 1120, and/or the like) may identify a section of the route based on the elevation information, as described above. In some implementations, the section is associated with a change in elevation.

As further shown in FIG. 12, process 1200 may include determining subsections of the section (block 1230). For example, the speed planning device (e.g., using elevation analysis module 1110, speed calculator module 1120, and/or the like) may determine subsections of the section, as described above.

As further shown in FIG. 12, process 1200 may include determining respective slopes of the subsections and respective lengths of the subsections (block 1240). For example, the speed planning device (e.g., using elevation analysis module 1110, speed calculator module 1120, and/or the like) may determine respective slopes of the subsections and respective lengths of the subsections, as described above.

As further shown in FIG. 12, process 1200 may include obtaining information identifying a mass associated with the vehicle (block 1250). For example, the speed planning device (e.g., using speed calculator module 1120, speed plan module 1130, and/or the like) may obtain information identifying a mass associated with the vehicle, as described above.

As further shown in FIG. 12, process 1200 may include generating a speed plan for the vehicle to traverse the section, wherein the speed plan indicates one or more speeds at which the vehicle is to correspondingly traverse the subsections based on the respective slopes of the subsections, the respective lengths of the subsections, and the mass associated with the vehicle (block 1260). For example, the speed planning device (e.g., using speed plan module 1130, and/or the like) may generate a speed plan for the vehicle to traverse the section, as described above. In some implementations, the speed plan indicates one or more speeds at which the vehicle is to correspondingly traverse the subsections based on the respective slopes of the subsections, the respective lengths of the subsections, and the mass associated with the vehicle.

As further shown in FIG. 12, process 1200 may include providing the speed plan to permit the vehicle to be controlled to traverse the section according to the one or more speeds of the speed plan (block 1270). For example, the speed planning device (e.g., using speed plan module 1130, and/or the like) may provide the speed plan to permit the vehicle to be controlled so as to traverse the section according to the one or more speeds of the speed plan, as described above.

Process 1200 may include additional implementations, such as any single implementation or any combination of implementations described below and/or in connection with one or more other processes described elsewhere herein.

In some implementations, the speed planning device, when generating the speed plan for the vehicle, may calculate a first candidate speed for the vehicle to traverse a section. In some implementations, the first candidate speed is calculated based on a slope of the section, a length of the section, and the mass associated with the vehicle. The speed planning device may calculate a second candidate speed for the vehicle to traverse a first subsection of the section. In some implementations, the second candidate speed is calculated based on a slope of the first subsection, a length of the first subsection, and the mass associated with the vehicle. The speed planning device may set, in the speed plan, a first speed as a slower speed of the first candidate speed and the second candidate speed. In some implementations, the first speed is one of the one or more speeds at which the vehicle is to traverse the first subsection.

In some implementations, the speed planning device, when generating the speed plan for the vehicle, may calculate a third candidate speed for the vehicle to traverse a second subsection of the section. In some implementations, the third candidate speed is calculated based on a slope of the second subsection, a length of the second subsection, and the mass associated with the vehicle. In some implementations, the first subsection and the second subsection are mutually exclusive subsections of the section. The speed planning device may set, in the speed plan, a second speed as a slower speed of the first candidate speed and the third candidate speed. In some implementations, the second speed is one of the one or more speeds at which the vehicle is to traverse the second subsection.

In some implementations, the speed planning device, when generating the speed plan for the vehicle, may calculate a third candidate speed for the vehicle to traverse a second subsection of the section. In some implementations, the third candidate speed is calculated based on a slope of the second subsection, a length of the second subsection, and the mass associated with the vehicle. In some implementations, the second subsection overlaps the first subsection. The speed planning device may set, in the speed plan, a second speed as a slowest speed of the first candidate speed, the second candidate speed, and the third candidate speed. In some implementations, the second speed is one of the one or more speeds at which the vehicle is to traverse the second subsection.

In some implementations, the speed planning device may determine that a slope of a first subsection of the subsections is greater than a threshold slope and set, in the speed plan, a constant or maximum speed at which the vehicle is to traverse the first subsection based on the slope of the first subsection being greater than the threshold slope.

In some implementations, the speed plan is configured to maintain a parameter, associated with the vehicle, within a threshold range as the vehicle traverses the section. In some implementations, the parameter includes at least one of a brake temperature of the vehicle, an engine coolant temperature of the vehicle, a heat rejection rate associated with a brake of the vehicle, or a heat capacity associated with the brake of the vehicle. In some implementations, the elevation information is obtained based on at least one of a schedule, an event involving the vehicle, or an event involving the device.

Additionally, or alternatively, a process may include obtaining elevation information associated with a route of a vehicle. For example, the speed planning device (e.g., using elevation analysis module 1110, and/or the like) may obtain elevation information associated with a route of a vehicle, as described above.

Such a process may include identifying a section of the route of the vehicle that is to be analyzed to control a speed of the vehicle through the section. For example, the speed planning device (e.g., using speed calculator module 1120, and/or the like) may identify a section of the route of the vehicle that is to be analyzed to control a speed of the vehicle through the section, as described above.

Such a process may include dividing the section of the route into subsections. For example, the speed planning device (e.g., using elevation analysis module 1110, speed calculator module 1120, and/or the like) may divide the section of the route into subsections, as described above.

Such a process may include determining respective slopes of the subsections based on the elevation information, as described above. For example, the speed planning device (e.g., using elevation analysis module 1110, speed calculator module 1120, and/or the like) may determine respective slopes of the subsections based on the elevation information, as described above.

Such a process may include obtaining information identifying a mass associated with the vehicle. For example, the speed planning device (e.g., using speed calculator module 1120, speed plan module 1130, and/or the like) may obtain information identifying a mass associated with the vehicle, as described above.

Such a process may include generating a speed plan for the vehicle to traverse the section, wherein the speed plan indicates one or more speeds at which the vehicle is to correspondingly traverse the subsections based on the respective slopes of the subsections, respective lengths of the subsections, and the mass associated with the vehicle. For example, the speed planning device (e.g., using speed plan module 1130, and/or the like) may generate a speed plan for the vehicle to traverse the section, as described above. In some implementations, the speed plan indicates one or more speeds at which the vehicle is to correspondingly traverse the subsections based on the respective slopes of the subsections, respective lengths of the subsections, and the mass associated with the vehicle.

Such a process may include performing an action associated with the speed plan to permit the vehicle to be controlled to traverse the section. For example, the speed planning device (e.g., using speed plan module 1130, and/or the like) may perform an action associated with the speed plan to permit the vehicle to be controlled to traverse the section, as described above.

Such a process may include additional implementations, such as any single implementation or any combination of implementations described below and/or in connection with one or more other processes described elsewhere herein.

In some implementations, two subsections of the subsections overlap in an overlapping section and the speed planning device may calculate two respective candidate speeds for the vehicle to traverse the two subsections, select a speed for the overlapping section from the two respective candidate speeds, and set the selected speed for the overlapping section as one of the one or more speeds of the speed plan. In some implementations, the selected speed for the overlapping section is a slower speed of the two respective candidate speeds.

In some implementations, a first set of the subsections includes halves of the section and a second set of the subsections includes quarters of the section. In some implementations, the speed plan includes four speeds corresponding to the quarters of the section and each of the four speeds is a minimum speed selected from candidate speeds for each of the quarters. In some implementations, the candidate speeds for each of the quarters are calculated based on a slope of the section, slopes of the halves of the section, and slopes of the quarters of the section.

In some implementations, the speed planning device, when dividing the section of the route into the subsections, may identify a degree of granularity associated with determining speeds for the speed plan and determine the subsections based on the degree of granularity.

In some implementations, the speed planning device, when performing the action, may cause information associated with the one or more speeds to be displayed, via a user interface, as the vehicle traverses the section of the route, in order to permit a user to control a speed of the vehicle according to the speed plan.

In some implementations, the speed planning device, when performing the action, may provide the speed plan to a vehicle control device, in order to permit the vehicle control device to automatically control an operating speed of the vehicle as the vehicle traverses the section.

In some implementations, the vehicle comprises an autonomous vehicle and the speed planning device may, when performing the action, cause the autonomous vehicle to traverse the section according to the one or more speeds of the speed plan.

Additionally, or alternatively, a process may include identifying a section of a route, wherein the section of the route is to be traversed by the vehicle within a threshold time period. For example, the speed planning device (e.g., using elevation analysis module 1110, speed calculator module 1120, and/or the like) may identify a section of a route, as described above. In some implementations, the section of the route is to be traversed by the vehicle within a threshold time period.

Such a process may include detecting a decline in the section based on the elevation information. For example, the speed planning device (e.g., using elevation analysis module 1110, speed calculator module 1120, and/or the like) may detect a decline in the section based on the elevation information, as described above.

Such a process may include identifying subsections of the section based on detecting the decline of the section. For example, the speed planning device, (e.g., using elevation analysis module 1110, speed calculator module 1120, and/or the like) may identify subsections of the section based on detecting the decline of the section, as described above.

Such a process may include determining respective slopes of the subsections based on the elevation information. For example, the speed planning device (e.g., using elevation analysis module 1110, speed calculator module 1120, and/or the like) may determine respective slopes of the subsections based on the elevation information, as described above.

Such a process may include obtaining information identifying a mass associated with the vehicle. For example, the speed planning device (e.g., using speed calculator module 1120, speed plan module 1130, and/or the like) may obtain information identifying a mass associated with the vehicle, as described above.

Such a process may include generating a speed plan for the vehicle to traverse the section, wherein the speed plan indicates one or more speeds at which the vehicle is to correspondingly traverse the subsections based on the respective slopes of the subsections, respective lengths of the subsections, and the mass associated with the vehicle. For example, the speed planning device (e.g., using elevation analysis module 1110, speed calculator module 1120, speed plan module 1130, and/or the like) may generate a speed plan for the vehicle to traverse the section, as described above. In some implementations, the speed plan indicates one or more speeds at which the vehicle is to correspondingly traverse the subsections based on the respective slopes of the subsections, respective lengths of the subsections, and the mass associated with the vehicle.

Such a process may include providing the speed plan to a vehicle control device, wherein the vehicle control device is configured to automatically control the speed of the vehicle, as the vehicle traverses the section according to the speed plan. For example, the speed planning device (e.g., using elevation analysis module 1110, speed calculator module 1120, speed plan module 1130, and/or the like) may provide the speed plan to a vehicle control device, as described above. In some implementations, the vehicle control device is configured to automatically control the speed of the vehicle, as the vehicle traverses the section according to the speed plan.

Such a process may include additional implementations, such as any single implementation or any combination of implementations described below and/or in connection with one or more other processes described elsewhere herein.

In some implementations, two subsections of the subsections overlap in an overlapping section and the speed planning device may calculate two respective candidate speeds for the vehicle to traverse the two subsections, select a speed for the overlapping section from the two respective candidate speeds, and set the selected speed for the overlapping section as one of the one or more speeds of the speed plan. In some implementations, the selected speed for the overlapping section is a slower speed of the two respective candidate speeds.

In some implementations, the speed planning device, when generating the speed plan, may select the one or more speeds to maintain a parameter, associated with vehicle, within a threshold range as the vehicle traverses the section. In some implementations, the parameter includes at least one of a brake temperature of the vehicle, an engine coolant temperature of the vehicle, a heat rejection rate associated with a brake of the vehicle, or a heat capacity associated with the brake of the vehicle.

In some implementations, the speed planning device may determine that a slope of a first subsection of the subsections is greater than a threshold slope and set, in the speed plan, a constant or maximum speed at which the vehicle is to traverse the first subsection based on the slope of the first subsection being greater than the threshold slope.

In some implementations, the speed planning device is communicatively coupled with a sensor on the vehicle and, when obtaining the information identifying the mass, the speed planning device may receive, from the sensor, the information identifying the mass associated with the vehicle.

In some implementations, the vehicle control device includes at least one of: a mechanical braking mechanism to retard the speed of the vehicle, a mechanical transmission of the vehicle, an electric drive to retard the speed of the vehicle, or an acceleration system to increase the speed of the vehicle.

Although FIG. 12 shows example blocks of process 1200, in some implementations, process 1200 may include additional blocks, fewer blocks, different blocks, or differently arranged blocks than those depicted in FIG. 12. Additionally, or alternatively, two or more of the blocks of process 1200 may be performed in parallel.

INDUSTRIAL APPLICABILITY

In some instances, a vehicle may be configured to be automatically controlled to traverse a route. For example, an autonomous vehicle at a work site may be configured to transfer material from one location of the work site to another location of the work site. In some instances, the vehicle may be controlled using a static speed mapping for the route to determine at which speeds the vehicle is to traverse the route. However, considering the hundreds, thousands, and/or millions of routes that vehicles may automatically traverse and/or the hundreds, thousands, and/or millions of work sites within which vehicles may operate automatically, the amount of resources needed to generate, maintain, and/or store the speed mappings would be costly. Furthermore, operating characteristics may vary across different types of vehicles, may change for each vehicle along a route, and/or may change over the operating life of the vehicle, which may create the need for even more speed mappings.

According to some implementations described herein, speed planning device 1010 may dynamically generate speed plans that may be used by a vehicle control device 1020 to automatically control a vehicle as the vehicle traverses a route. Using received elevation information for the route and a mass of the vehicle (which can be automatically determined and can change over the course of the route based on the operation of the vehicle), the speed planning device 1010 may automatically generate a speed plan for the vehicle as the vehicle traverses the route. Accordingly, speed planning device 1010 may customize a speed plan for the vehicle, avoiding the need to waste computing resources (e.g., processing resources, memory resources, storage resources, and/or the like) and/or network resources on generating, maintaining, and/or storing speed mappings for one or more routes that the vehicle may traverse, for one or more work sites within which the vehicle may operate, and/or for any number of operating characteristics that the vehicle may experience over the operating life of the vehicle.

Speed planning device 1010 may generate the speed plan to ensure that one or more parameters of the vehicle are maintained within a range. For example, to preserve the operating life of the vehicle and/or one or more components of the vehicle (e.g., a braking mechanism), speed planning device 1010 may generate speed plans to ensure that the vehicle maintains a controllable speed down a decline of the route (e.g., to avoid a "point of no return") and/or that the vehicle maintains a speed down the decline that would not shorten the life span of the vehicle and/or one or more components of the vehicle. Speed planning device 1010 may calculate and select a speed for a speed plan based on, for example, the variable mass of the vehicle (including a mass of the load of the vehicle, which also can vary along a route), the length of the decline and/or a slope associated with the decline. Speed planning device 1010 may use a machine learning model (e.g., speed planning model) that can be trained to further extend the life of the vehicle and/or the life of one or more components of the vehicle over the operating life of the vehicle. Accordingly, speed planning device 1010 may conserve hardware resources associated with replacing and/or repairing hardware components, such as braking mechanisms, due to vehicles descending a decline without considering a mass of the vehicle and/or that the decline is approaching. Furthermore, speed planning device 1010 may conserve hardware resources associated with replacing and/or repairing hardware components and/or replacing or repairing vehicles that are damaged attempting to traverse a route without consideration of the fluctuating mass of the vehicle and/or the upcoming elevation of the route (including elevation that is down the route at least one kilometer), as described herein.

In some implementations, speed planning device 1010 may be customizable to optimize one or more performance capabilities of the vehicle (e.g., speed, lifespan, fuel consumption, battery life, and/or the like). For example, speed planning device 1010 may generate a speed plan that enables vehicle control device 1020 to control the vehicle at optimal speeds according to the performance characteristics that are to be optimized as the vehicle traverses the route. The optimal speeds may be calculated based on operating characteristics and/or parameters that may be configured to optimize a certain performance capability of the vehicle. The performance capability may include performing an operation or traversing the route with speed (e.g., in a shortest time), conserving hardware associated with the vehicle (e.g., a lifespan associated with one or more components (e.g., parts of a brake system) of the vehicle, fuel costs, electric power costs, and/or the like), conserving resources associated with determining a speed for the vehicle and/or controlling a speed of the vehicle (e.g., computing resources, network resources, and/or the like used to generate the speed plans), and/or the like. Accordingly, computing resources and/or network resources that may otherwise be used to generate and/or store separate speed mappings for separate performance needs can be conserved.

In some implementations, speed planning device 1010, as mentioned above, may iteratively generate a speed plan for the vehicle. The frequency with which the speed plans are generated and/or updated for a vehicle may be customizable. For example, speed planning device 1010 may generate speed plans relatively frequently to increase the probability that the vehicle is controlled to avoid any damage to the vehicle and/or component of the vehicle. On the other hand, speed planning device 1010 may generate speed plans less frequently to conserve computing resources and/or network resources used to generate and/or provide the speed plans. In some implementations, speed planning device 1010 may dynamically alter the frequency of generating the speed plans to objectively control the frequency with which the speed plans are generated. For example, for sections of a route that include relatively few elevation changes and/or slope changes, speed plans may be generated less frequently (e.g., to conserve computing resources and/or network resources) and for sections of a route that include relatively many elevation changes and/or slope changes, speed plans may be generated more frequently (e.g., to increase the probability of avoiding any damage to the vehicle and/or a component of the vehicle). Furthermore, speed planning device may dynamically alter the frequency based on changes in mass of the vehicle, changes in operating conditions of the vehicle, changes in weather, changes in traffic, changes in the route, and/or the like.

Similar to the frequency of generating speed plans (and with similar benefits), speed planning device 1010 can be customizable to adjust a degree of granularity of a speed planning analysis to generate the speed plans. Furthermore, speed planning device 1010 may dynamically increase or reduce the degree of granularity of a speed planning analysis based on the amount of elevation changes and/or slope changes in a section of a route. Accordingly, when the vehicle is traversing a section of the route that has multiple elevation changes and/or slope changes, speed planning device 1010 may increase the degree of granularity of the speed planning analysis to increase the probability of avoiding damage to the vehicle and/or a component of the vehicle.

On the other hand, if the vehicle is traversing or approaching a section of the route that is relatively flat and/or if the slope of the section is relatively constant (e.g., a long ramp), speed planning device 1010 may reduce the degree of granularity of the speed planning analysis to avoid wasting computing resources and/or network resources that may otherwise be wasted with a higher degree of granularity.

As used herein, the articles "a" and "an" are intended to include one or more items and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description but is not intended to be exhaustive or to limit the implementations to the precise form disclosed. Modifications and variations may be made in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

What is claimed is:

1. A method, comprising:
   obtaining, by a device, elevation information associated with a route for a vehicle;
   identifying, by the device, a section of the route based on the elevation information,
      wherein the section is associated with a change in elevation;
   determining, by the device, subsections of the section;
   determining, by the device, respective slopes of the subsections and respective lengths of the subsections;
   obtaining, by the device, information identifying a mass associated with the vehicle;
   generating, by the device, a speed plan for the vehicle to traverse the section,
      wherein the speed plan indicates one or more speeds at which the vehicle is to correspondingly traverse the subsections based on the respective slopes of the subsections, the respective lengths of the subsections, and the mass associated with the vehicle; and
   providing, by the device, the speed plan to permit the vehicle to be controlled to traverse the section according to the one or more speeds of the speed plan.

2. The method of claim 1, wherein generating the speed plan for the vehicle comprises:
   calculating a first candidate speed for the vehicle to traverse the section,
      wherein the first candidate speed is calculated based on a slope of the section, a length of the section, and the mass associated with the vehicle;
   calculating a second candidate speed for the vehicle to traverse a first subsection of the subsections,
      wherein the second candidate speed is calculated based on a slope of the first subsection, a length of the first subsection, and the mass associated with the vehicle; and
   setting, in the speed plan, a first speed as a slower speed of the first candidate speed and the second candidate speed,
      wherein the first speed is one of the one or more speeds at which the vehicle is to traverse the first subsection.

3. The method of claim 2, wherein generating the speed plan for the vehicle further comprises:
   calculating a third candidate speed for the vehicle to traverse a second subsection of the subsections,
      wherein the third candidate speed is calculated based on a slope of the second subsection, a length of the second subsection, and the mass associated with the vehicle, and
      wherein the first subsection and the second subsection are mutually exclusive subsections of the section; and
   setting, in the speed plan, a second speed as a slower speed of the first candidate speed and the third candidate speed,
      wherein the second speed is one of the one or more speeds at which the vehicle is to traverse the second subsection.

4. The method of claim 2, wherein generating the speed plan for the vehicle further comprises:
   calculating a third candidate speed for the vehicle to traverse a second subsection of the subsections,
      wherein the third candidate speed is calculated based on a slope of the second subsection, a length of the second subsection, and the mass associated with the vehicle, and
      wherein the second subsection overlaps the first subsection; and
   setting, in the speed plan, a second speed as a slowest speed of the first candidate speed, the second candidate speed, and the third candidate speed,
      wherein the second speed is one of the one or more speeds at which the vehicle is to traverse the second subsection.

5. The method of claim 1, further comprising:
   determining that a slope of a first subsection of the subsections is greater than a threshold slope; and
   setting, in the speed plan, a constant speed at which the vehicle is to traverse the first subsection based on the slope of the first subsection being greater than the threshold slope.

6. The method of claim 1, wherein the speed plan is configured to maintain a parameter, associated with the vehicle, within a threshold range as the vehicle traverses the section,
   wherein the parameter includes at least one of:
      a brake temperature of the vehicle;
      an engine coolant temperature of the vehicle;
      a heat rejection rate associated with a brake of the vehicle; or
      a heat capacity associated with the brake of the vehicle.

7. The method of claim 1, wherein the elevation information is obtained based on at least one of:
   a threshold time period expiring;
   a schedule;
   an event involving the vehicle; or
   an event involving the device.

8. A device, comprising:
   one or more memories; and
   one or more processors, communicatively coupled to the one or more memories, to:
      obtain elevation information associated with a route of a vehicle;

identify a section of the route of the vehicle that is to be analyzed to control a speed of the vehicle through the section;

divide the section of the route into subsections;

determine respective slopes of the subsections based on the elevation information;

obtain information identifying a mass associated with the vehicle;

generate a speed plan for the vehicle to traverse the section, wherein the speed plan indicates one or more speeds at which the vehicle is to correspondingly traverse the subsections based on the respective slopes of the subsections, respective lengths of the subsections, and the mass associated with the vehicle; and perform an action associated with the speed plan to permit the vehicle to be controlled to traverse the section.

9. The device of claim 8, wherein two subsections of the subsections overlap in an overlapping section, and the one or more processors are to:

calculate two respective candidate speeds for the vehicle to traverse the two subsections;

select a speed for the overlapping section from the two respective candidate speeds, wherein the selected speed for the overlapping section is a slower speed of the two respective candidate speeds; and set the selected speed for the overlapping section as one of the one or more speeds of the speed plan.

10. The device of claim 8, wherein a first set of the subsections includes halves of the section and a second set of the subsections includes quarters of the section, wherein the speed plan includes four speeds corresponding to the quarters of the section and each of the four speeds is a minimum speed selected from candidate speeds for each of the quarters, wherein the candidate speeds for each of the quarters are calculated based on a slope of the section, slopes of the halves of the section, and slopes of the quarters of the section.

11. The device of claim 8, wherein the one or more processors, when dividing the section of the route into the subsections, are to:

identify a degree of granularity associated with determining speeds for the speed plan; and determine the subsections based on the degree of granularity.

12. The device of claim 8, wherein the one or more processors, when performing the action, are to:

cause information associated with the one or more speeds to be displayed, via a user interface, as the vehicle traverses the section of the route to permit a user to control a speed of the vehicle according to the speed plan.

13. The device of claim 8, wherein the one or more processors, when performing the action are to:

provide the speed plan to a vehicle control device to permit the vehicle control device to automatically control an operating speed of the vehicle as the vehicle traverses the section.

14. The device of claim 8, wherein the vehicle comprises an autonomous vehicle, wherein the one or more processors, when performing the action, are to:

cause the autonomous vehicle to traverse the section according to the one or more speeds of the speed plan.

15. A system comprising:

a vehicle control device capable of controlling a speed of a vehicle; and a speed planning device to determine one or more speeds at which the vehicle is to traverse a route based on elevation information associated with the route, wherein the speed planning device is to:

identify a section of the route, wherein the section of the route is to be traversed by the vehicle within a threshold time period;

detect a decline in the section based on the elevation information;

identify subsections of the section based on detecting the decline of the section;

determine respective slopes of the subsections based on the elevation information;

obtain information identifying mass associated with the vehicle;

generate a speed plan for the vehicle to traverse the section, wherein the speed plan indicates one or more speeds at which the vehicle is to correspondingly traverse the subsections based on the respective slopes of the subsections, respective lengths of the subsections, and the mass associated with the vehicle; and provide the speed plan to the vehicle control device, wherein the vehicle control device is configured to automatically control the speed of the vehicle, as the vehicle traverses the section according to the speed plan.

16. The system of claim 15, wherein two subsections of the subsections overlap in an overlapping section, and the speed planning device is to:

calculate two respective candidate speeds for the vehicle to traverse the two subsections;

select a speed for the overlapping section from the two respective candidate speeds, wherein the selected speed for the overlapping section is a slower speed of the two respective candidate speeds; and set the selected speed for the overlapping section as one of the one or more speeds of the speed plan.

17. The system of claim 15, wherein the speed planning device, when generating the speed plan, is select the one or more speeds to maintain a parameter, associated with vehicle, within a threshold range as the vehicle traverses the section, wherein the parameter includes at least one of:

a brake temperature of the vehicle;

an engine coolant temperature of the vehicle;

a heat rejection rate associated with a brake of the vehicle; or a heat capacity associated with the brake of the vehicle.

18. The system of claim 15, wherein the speed planning device is further to:

determine that a slope of a first subsection of the subsections is greater than a threshold slope; and set, in the speed plan, a constant speed at which the vehicle is to traverse the first subsection based on the slope of the first subsection being greater than the threshold slope.

19. The system of claim 15, wherein the speed planning device is communicatively coupled with a sensor on the vehicle and, when obtaining the information identifying the mass, the speed planning device is to:

receive, from the sensor, the information identifying the mass associated with the vehicle.

20. The system of claim 15, wherein the vehicle control device includes at least one of:
a mechanical braking mechanism to retard the speed of the vehicle;
a mechanical transmission of the vehicle;
an electric drive to retard the speed of the vehicle; or
an acceleration system to increase the speed of the vehicle.

\* \* \* \* \*